US 7,392,062 B2

(12) United States Patent
Kuriki et al.

(10) Patent No.: US 7,392,062 B2
(45) Date of Patent: Jun. 24, 2008

(54) MOBILE RADIO COMMUNICATION SYSTEM

(75) Inventors: Koji Kuriki, Yokohama (JP); Shigehiko Hirata, Yokohama (JP); Shogo Matsuoka, Yokohama (JP); Takao Shikama, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 133 days.

(21) Appl. No.: 11/007,518

(22) Filed: Dec. 8, 2004

(65) Prior Publication Data
US 2006/0073849 A1 Apr. 6, 2006

(30) Foreign Application Priority Data
Sep. 30, 2004 (JP) ............................. 2004-285670

(51) Int. Cl.
*H04B 1/38* (2006.01)
(52) U.S. Cl. ............... 455/560; 455/422.1; 455/445; 455/517; 455/452.1; 455/436; 370/338; 370/331
(58) Field of Classification Search .............. 455/422.1, 455/428, 433, 436, 445, 517–519, 560–561, 455/439, 451–453; 370/331–335, 328–329, 370/341, 338
See application file for complete search history.

(56) References Cited

U.S. PATENT DOCUMENTS

| | | | | |
|---|---|---|---|---|
| 5,711,004 A * | 1/1998 | Blasiak et al. | ............... | 455/436 |
| 5,970,417 A * | 10/1999 | Toyryla et al. | ............... | 455/519 |
| 6,032,046 A * | 2/2000 | Nakano | ............... | 455/450 |
| 6,282,429 B1 * | 8/2001 | Baiyor et al. | ............... | 455/512 |
| 6,298,239 B1 * | 10/2001 | Yonemoto et al. | ............ | 455/466 |
| 6,385,461 B1 * | 5/2002 | Raith | ........................ | 455/518 |
| 6,711,408 B1 * | 3/2004 | Raith | ........................ | 455/440 |
| 7,024,195 B2 * | 4/2006 | Miriyala et al. | ............. | 455/443 |
| 2002/0147020 A1 * | 10/2002 | Iguchi et al. | ................. | 455/452 |
| 2003/0026226 A1 * | 2/2003 | Miura | ........................ | 370/335 |
| 2003/0096628 A1 * | 5/2003 | Bar-On et al. | ............... | 455/518 |
| 2003/0125039 A1 * | 7/2003 | Lachtar et al. | .............. | 455/453 |
| 2003/0139186 A1 * | 7/2003 | Igarashi et al. | .............. | 455/438 |

(Continued)

FOREIGN PATENT DOCUMENTS

JP 2000-068928 3/2000

(Continued)

OTHER PUBLICATIONS

European Search Report dated Feb. 6, 2006.

*Primary Examiner*—William Trost
*Assistant Examiner*—Kamran Afshar
(74) *Attorney, Agent, or Firm*—Katten Muchin Rosenman LLP

(57) ABSTRACT

A mobile radio communication system is provided for keeping high-quality communications and preventing disconnection of a radio link in fast movement. The system includes the radio network controller provided with a storage unit and a control unit. The storage unit stores grouped-user-equipments management information to be used for identifying and managing a plurality of user equipments as one group. The control unit controls the user equipments belonging to the same group so that they may be connected with their respective ones of the cells formed by the node bases. This allows the plurality of user equipments belonging to the same group to execute multiplex communications, thereby preventing simultaneous disconnection of the radio links of the user equipments belonging to the same group even when those user equipments are moving fast.

7 Claims, 24 Drawing Sheets

U.S. PATENT DOCUMENTS

| | | |
|---|---|---|
| 2003/0224774 A1* | 12/2003 | Cheng et al. ............. 455/422.1 |
| 2004/0157600 A1* | 8/2004 | Stumpert et al. ............ 455/436 |
| 2004/0203960 A1* | 10/2004 | Nagato et al. ............... 455/466 |
| 2004/0235525 A1* | 11/2004 | Chater-Lea ................. 455/560 |
| 2006/0040700 A1* | 2/2006 | Roberts et al. .............. 455/525 |
| 2006/0142032 A1* | 6/2006 | Derakhshan et al. ........ 455/525 |
| 2007/0184839 A1* | 8/2007 | Igarashi et al. .............. 455/436 |

FOREIGN PATENT DOCUMENTS

WO    WO 2004/030238    4/2004

* cited by examiner

| NUMBER | cell_id | RL#1 | RL#2 | RL#3 | NUMBER OF RELATED LINKS |
|---|---|---|---|---|---|
| 0 | 257 | ON | ON | ON | Active Set |
| 1 | 258 | ON | ON | ON | 3 |
| 2 | 259 | ON | ON | — | 2 |
| 3 | 260 | ON | — | ON | 2 |
| 4 | 261 | ON | — | — | 1 |
| 5 | 320 | ON | ON | — | 2 |
| 6 | 513 | ON | ON | ON | 3 |
| 7 | 514 | ON | ON | ON | 3 |
| 8 | 771 | ON | ON | ON | 3 |
| 9 | 1281 | ON | ON | ON | 3 |
| 10 | 1601 | ON | ON | ON | 3 |
| 11 | 1 | ON | ON | — | 2 |
| 12 | 4 | ON | ON | — | 2 |
| 13 | 64 | ON | ON | — | 2 |
| 14 | 1793 | ON | ON | ON | 3 |
| 15 | 2305 | ON | ON | ON | 3 |
| 16 | 2625 | ON | ON | — | 2 |
| 17 | 11521 | ON | ON | ON | 3 |
| 18 | 11522 | ON | ON | ON | 3 |
| 19 | 11584 | ON | ON | ON | 3 |
| 20 | 7939 | ON | ON | ON | Active Set |
| 21 | 2817 | ON | ON | ON | 3 |
| 22 | 3137 | ON | ON | ON | 3 |
| 23 | 3843 | ON | ON | ON | 3 |
| 24 | 3844 | ON | ON | ON | Active Set |
| 25 | 3904 | ON | ON | ON | 3 |
| 26 | 6661 | ON | ON | ON | 3 |
| 27 | 10245 | ON | ON | ON | 3 |
| 28 | 10565 | ON | ON | — | 2 |
| 29 | 7940 | — | ON | ON | 2 |
| 30 | 6149 | — | ON | — | 1 |
| 31 | 1025 | — | — | ON | 1 |
| 32 | 5 | — | — | ON | 1 |
| 33 | 2049 | — | — | ON | 1 |
| 34 | 3845 | — | — | ON | 1 |
| 35 | 1 | — | — | ON | 1 |
| 36 | 5124 | — | — | ON | 1 |
| 37 | 5381 | — | — | ON | 1 |

FIG. 11

| NUMBER | cell_id |
|---|---|
| 0 | 257 |
| 1 | 7939 |
| 2 | 3844 |
| 3 | 258 |
| 4 | 513 |
| 5 | 514 |
| 6 | 771 |
| 7 | 1281 |
| 8 | 1601 |
| 9 | 1793 |
| 10 | 2305 |
| 11 | 11521 |
| 12 | 11522 |
| 13 | 11584 |
| 14 | 2817 |
| 15 | 3137 |
| 16 | 3843 |
| 17 | 3904 |
| 18 | 6661 |
| 19 | 10245 |
| 20 | 259 |
| 21 | 260 |
| 22 | 320 |
| 23 | 1 |
| 24 | 4 |
| 25 | 64 |
| 26 | 2625 |
| 27 | 10565 |
| 28 | 7940 |
| 29 | 261 |
| 30 | 6149 |
| 31 | 1025 |

FIG. 12

| NUMBER | cell_id | RL#1 | RL#2 | RL#3 | RL#4 | NUMBER OF RELATED LINKS |
|---|---|---|---|---|---|---|
| 0 | 257 | ON | — | ON | — | Active Set |
| 1 | 258 | ON | — | ON | ON | 3 |
| 2 | 259 | ON | — | — | — | 1 |
| 3 | 260 | ON | — | ON | ON | 3 |
| 4 | 261 | ON | — | — | ON | 2 |
| 5 | 320 | ON | — | — | — | 1 |
| 6 | 513 | ON | — | ON | — | 2 |
| 7 | 514 | ON | — | ON | ON | 3 |
| 8 | 771 | ON | — | ON | ON | 3 |
| 9 | 1281 | ON | — | ON | ON | 3 |
| 10 | 1601 | ON | — | ON | ON | 3 |
| 11 | 1 | ON | — | — | ON | 2 |
| 12 | 4 | ON | — | — | ON | 2 |
| 13 | 64 | ON | — | — | ON | 2 |
| 14 | 1793 | ON | — | ON | ON | 3 |
| 15 | 2305 | ON | — | ON | ON | 3 |
| 16 | 2625 | ON | — | — | ON | 2 |
| 17 | 11521 | ON | — | ON | — | 2 |
| 18 | 11522 | ON | — | ON | ON | Active Set |
| 19 | 11584 | ON | — | ON | — | 2 |
| 20 | 7939 | ON | — | ON | — | 2 |
| 21 | 2817 | ON | — | ON | ON | 3 |
| 22 | 3137 | ON | — | ON | — | 2 |
| 23 | 3843 | ON | — | ON | ON | 3 |
| 24 | 3844 | ON | — | ON | ON | Active Set |
| 25 | 3904 | ON | — | ON | — | 2 |
| 26 | 6661 | ON | — | ON | ON | 3 |
| 27 | 10245 | ON | — | ON | — | 2 |
| 28 | 10565 | ON | — | — | — | 1 |
| 29 | 7940 | — | — | ON | ON | 2 |
| 30 | 6149 | — | — | — | — | 0 |
| 31 | 1025 | — | — | ON | ON | 2 |
| 32 | 5 | — | — | ON | ON | 2 |
| 33 | 2049 | — | — | ON | — | 1 |
| 34 | 3845 | — | — | ON | — | 1 |
| 35 | 1 | — | — | ON | ON | 2 |
| 36 | 5124 | — | — | ON | ON | 2 |
| 37 | 5381 | — | — | ON | — | 1 |

FIG. 13

| NUMBER | cell_id |
|---|---|
| 0 | 257 |
| 1 | 11522 |
| 2 | 3844 |
| 3 | 258 |
| 4 | 260 |
| 5 | 514 |
| 6 | 771 |
| 7 | 1281 |
| 8 | 1601 |
| 9 | 1793 |
| 10 | 2305 |
| 11 | 2817 |
| 12 | 3843 |
| 13 | 6661 |
| 14 | 261 |
| 15 | 513 |
| 16 | 1 |
| 17 | 4 |
| 18 | 64 |
| 19 | 2625 |
| 20 | 11521 |
| 21 | 11584 |
| 22 | 7939 |
| 23 | 3137 |
| 24 | 3904 |
| 25 | 10245 |
| 26 | 7940 |
| 27 | 1025 |
| 28 | 5 |
| 29 | 1 |
| 30 | 5124 |
| 31 | 259 |

FIG. 14

MOBILE RADIO COMMUNICATION SYSTEM

CROSS-REFERENCE TO RELATED APPLICATIONS

This application is based upon and claims the benefits of priority from the prior Japanese Patent Application No. 2004-285670, filed on Sep. 30, 2004, the entire contents of which are incorporated herein by reference.

BACKGROUND OF THE INVENTION (1) Field of the Invention

The present invention relates to a mobile radio communication system, and more particularly to the mobile radio communication system which adopts the CDMA (Code Division Multiple Access) system.

(2) Description of the Related Art

The CDMA system is more likely to be the representative mobile radio communication system of a radio interface because this system may accommodate lots of user equipments on one band, keep the speech quality excellent and also keep the speech privacy high.

FIG. 23 illustrates an exemplary arrangement of the conventional mobile radio communication system that adopts the CDMA system (referred to as the CDMA system mobile radio communication system).

The mobile radio communication system is arranged to have mobile switching centers (each of which is often referred simply to as the MSC) 801 and 802, radio network controllers (each of which is often referred simply to as the RNC) 803 and 804, node bases 805, 806, 807, 808, 809, 810, a user equipment (which is often referred simply to as the UE) 811. This communication system takes a pyramidal network with the MSCs 801 and 802 located topmost.

The MSCs 801 and 802 are connecting nodes between a radio network and a general switched network. For example, when a subordinate radio network of the MSC 801 issues a call connecting (location registration) request to the outside of the switched network of the MSC 801, the MSC 801 is served to be connected with the corresponding other MSC such as the MSC 802. Further, in a case that a receive request is issued outside the switched network of the MSC 801, if the location information of the destination UE 811 is recognized inside the switched network of the MSC 801, the UE 811 transfers a receive signal to the RNC of the concerned area such as the RNC 803. The connecting node for exchanging packets is also called xGSN (x-GPRS (Global Packet Radio Service) Support Node). In the following description, the MSC 801 or 802 cover this connecting node.

The RNC 803 or 804 performs the radio network control between the MSC 801 and the node bases 805 to 810, the call-connecting (or call-ending) control therebetween, the hand-over control therebetween, and the control of the connecting rate (communication rate) of the UE 811. When originating a call (registering a location), the RNC 803 or 804 notifies the MSC 801 of the switched network of a signal passing through one of the node bases 805 to 810 and then performs the radio networking with the concerned node base, for example, the node base 805. When receiving a call, the RNC 803 or 804 transfers the signal from the MSC 801 to a plurality of node bases located close to the UE 811, for example, the node bases 805, 806 and 807, and then receives a response from the UE 811 through the node base of the area where the UE 811 is located, for example, the node base 805. This operation allows the same connecting control (network control) as that in originating a call to be carried out.

The node bases 805 to 810 form their radio zones (each of which is referred to as a cell) for their respective locations. Further, these node bases have a function of relaying a call control signal (origination and location registration) from the UE 811 to the RNC 803 or 804 and also relaying a radio network control signal from the RNC 803 or 804 to the UE 811.

The CDMA system mobile radio communication system utilizes a cellular system that is arranged to cover a service area with lots of cells. Through this cellular system, the CDMA type mobile radio communication system performs a radio multi-link control and a radio network mobile control for supplying high-quality services.

The radio multi-link control is executed to overlap the cell of one node base with those of the other adjacent node bases so that a plurality of radio networks may be connected with one another and thereby to selectively synthesize or restore the transmission informations from those networks. This selective synthesis and restoration makes it possible to supply high-quality radio communication.

The mobile control is executed to continuously connect and disconnect the radio network (which is referred to as the hand-over operation) with movement of the UE 811 on the assumption of the function of the radio multi-link control. This makes it possible to continue the mobile communication.

The conventional hand-over procedure will be described below.

FIG. 24 illustrates the hand-over operation to be executed with movement of the UE.

In FIG. 24, the UE 811 is moved from a cell 807a of the node base 807 managed by the RNC 803 of FIG. 23 to the cell 808a of the node base 808 managed by the RNC 804. The CDMA system mobile control allows the RNC 803 or 804 to switch the cell 807a to the adjacent cell 808a when the UE 811 is moved. The switching of the cells from one to the other means connection and disconnection of the radio links.

The UE 811 constantly monitors the quality (electric power value) of the adjacent cells based on the information of the hand-over-executable adjacent cells pre-notified by the RNC 803 when a call is connected. For example, in the case of detecting a cell with higher quality than the quality of the cell 807a in communication in the hand-over interval as shown in FIG. 24, the hand-over request for the cell 808a is transmitted to the RNC 803. In a case that the concerned cell 808a is located out of the RNC 803 as shown in FIG. 24, the RNC 803 that has received the hand-over request transmits a request for setting up a radio link to the hand-over destination RNC 804 that manages the cell 808a. If the concerned cell 808a is located inside the RNC 803, the request for setting up a radio link with the destination cell is transmitted to the RNC 803.

If the concerned cell 808a is located outside the RNC 803, the hand-over destination RNC 804 that has received the request for setting up the radio link operates to set up the radio link in association with the node base 808 managed by the RNC 804. At a time, the information of the adjacent cell managed by the hand-over destination RNC 804 is reported to the hand-over source RNC 803.

The hand-over source RNC 803, which has received the report about the information of the adjacent cell of the hand-over destination RNC 804, operates to edit the information of the adjacent cell to be notified to the UE 811 from the existing adjacent cell information of the adjacent hand-over destination cell information and then report the edited cell information to the UE 811.

The adjacent cell information to be used by this hand-over system means the information in which all the adjacent cells around any cell are made active.

The CDMA system mobile radio communication system utilizes a Rake synthesis by which multi-paths delayed from each other are separated in time and synthesized in phase, for the purpose of diffusing the data signal through fast diffusion code series when transmitting the data signal. Further, this communication system keeps the quality of the received signal higher by the effective use of the signal power of the multi-paths. Moreover, this communication system enables to execute the communication through a plurality of cells by overlapping the signals from two or more cells with one another in time when receiving or transmitting the signals.

Another conventional technique has been provided which includes a control station that operates to discriminate the quantity and quality of the speech received from the plurality of node bases and then issues a request for changing the transmission output of the downstream control signal to the node base according to the discriminated result. This control station allows the UE that supports the dual mode to send and receive the upstream and the downstream control signals to and from the node base, which makes it possible to lessen call congestion and prevent the speech quality from being degraded without restricting origination or receive of a call (disconnection of a call). This technique may be referred in the Japanese Unexamined Patent Publication 2000-68928.

The recent introduction of various new techniques leads to improving the transmission speed of the data communication in the mobile station year by year. Moreover, the adoption of the communication system through a plurality of cells also leads to realizing the communication system that may keep the speech hardly disconnected.

However, the ways of use of the radio communication are becoming more and more variable. Moreover, the quality of the radio communication is requested to be higher and higher for some ways of use such as a radio or a TV relay.

For the wired communication, it is common to utilize the dual communication system that secures two lines in communication for securing the quality of communication. However, for the radio communication, no such means is provided, so that it has been difficult to secure the high-quality communication.

Moreover, it has been requested to keep the radio communication the substantially same high quality as that of the wired communication, that is, keep the radio communication hardly disconnected.

SUMMARY OF THE INVENTION

The present invention is made in consideration of the foregoing respects. It is therefore an object of the present invention to provide a mobile radio communication system which is arranged to keep the speech quality excellent and prevent the radio communication from being disconnected even when the system is moved fast.

In carrying out the object, the present invention provides a mobile radio communication system. The mobile radio communication system includes a plurality of mobile user equipments that are moving in concert as one group, a plurality of node bases, and a radio network controller having a storage unit for storing grouped-use-equipments information for identifying the plurality of mobile user equipments as one group and managing them as one group and a control unit for controlling the mobile user equipments belonging to one group so that each of those user equipments may be connected with the corresponding radio zone.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 11 is a table showing an example of the peripheral cell information.

FIG. 12 is a table showing candidates of peripheral cell information to be notified to the mobile user equipment.

FIG. 13 is a table showing an example of peripheral cell information in deleting or adding a radio link.

FIG. 14 is a table showing candidates of the peripheral cell information to be notified to the mobile user equipment.

DESCRIPTION OF THE PREFERRED EMBODIMENTS

Hereafter, the embodiments of the present invention will be described with reference to the appended drawings.

According to the embodiments of the invention, a plurality of UEs (User Equipments) are moved in concert as a group.

Then, at first, a plurality of UEs are arranged as one combination.

Figure 2:
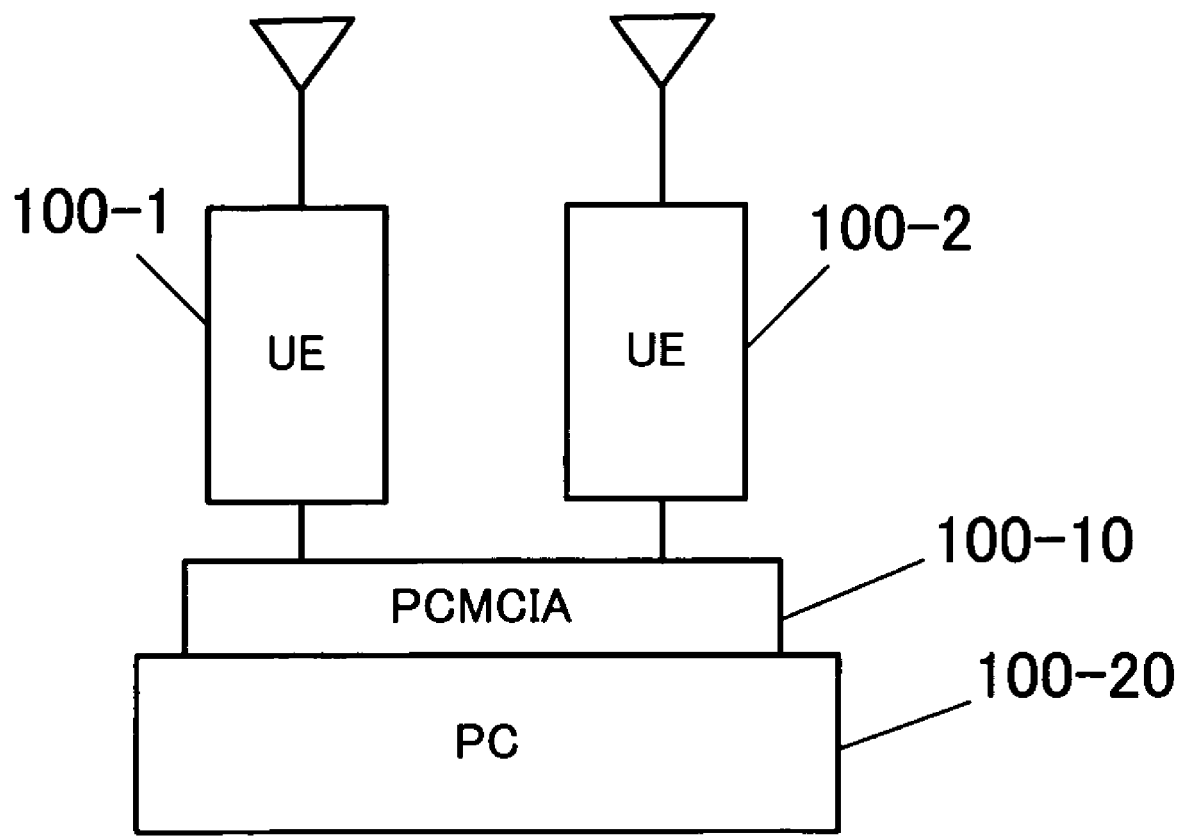
FIG. 2 is a system diagram showing a mobile radio communication system arranged to have a plurality of UEs as one group and to separately provide the UEs.

FIG. 2 shows an exemplary arrangement of the grouped UEs, in which the UEs are separately provided.

The UEs 100-1 and 100-2, each of which includes proper identify information (to be described below), are connected with a PC 100-20 through a PCMCIA (Personal Computer Memory Card International Association) interface card 100-10, for example. If the PC 100-20 includes the function of the interface card built therein, the UEs 100-1 and 100-2 may be directly connected with the PC 100-20. The PC 100-20 transfers speech or data through the UEs 100-1 and 100-2. In this case, both of the UEs are connected with the same destination (called destination) and at once output the same data.

The foregoing arrangement makes it possible to back up the radio interval like the wired communication. Hence, while the PC 100-20 is transferring speech or data, no network is disconnected in the hand-over operation if one of the UEs 100-1 and 100-2 is active in communication.

Figure 3:
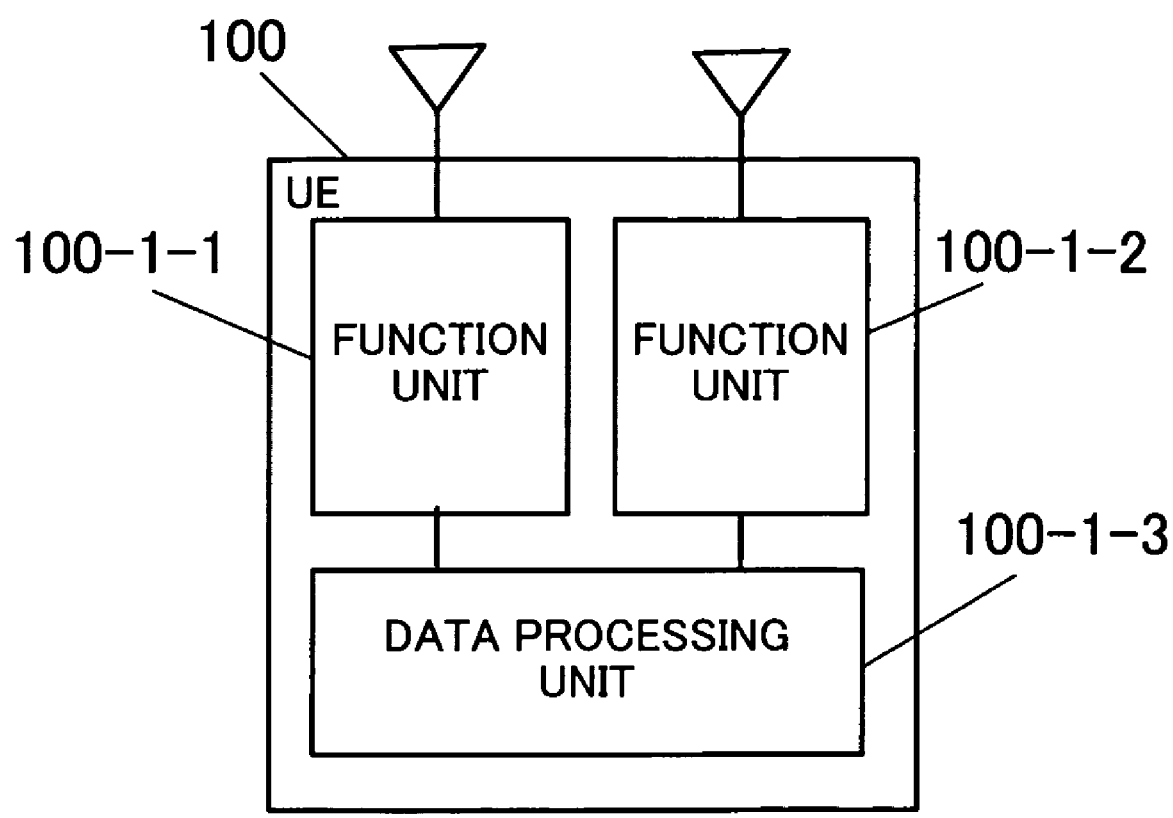
FIG. 3 is a system diagram showing a mobile radio communication system arranged to have a plurality of UEs as one group and to provide one UE with a plurality of function units for network connection.

FIG. 3 shows an exemplary arrangement used for combining two or more UEs as one group, in which two or more function units used for connecting with the network are provided for one UE.

The UE 100 includes the function sections 100-1-1 and 100-1-2 for connecting with the network so that the UE 100 may transfer speech or data and a data processing unit 100-1-3 for processing the data. The function sections 100-1-1 and 100-1-2 have proper identify information, respectively.

The function units 100-1-1 and 100-1-2 of the UE 100 are connected with the same destination (called destination) and output the same data.

This arrangement makes it possible to back up the radio interval like the wired communication. Hence, while the UE 100 is transferring speech or data, no network is disconnected in the hand-over operation if one of the function units 100-1-1 and 100-1-2 is active in communication.

In the following, the description will be oriented to the mobile radio communication system provided with the arrangement shown in FIG. 2. The arrangement shown in FIG. 3 may be applied to the communication system only if the UEs 100-1 and 100-2 are replaced with the function units 100-1-1 and 100-1-2. In addition, the interface card 100-10 and the PC 100-20 are left out in the following description.

Figure 1:
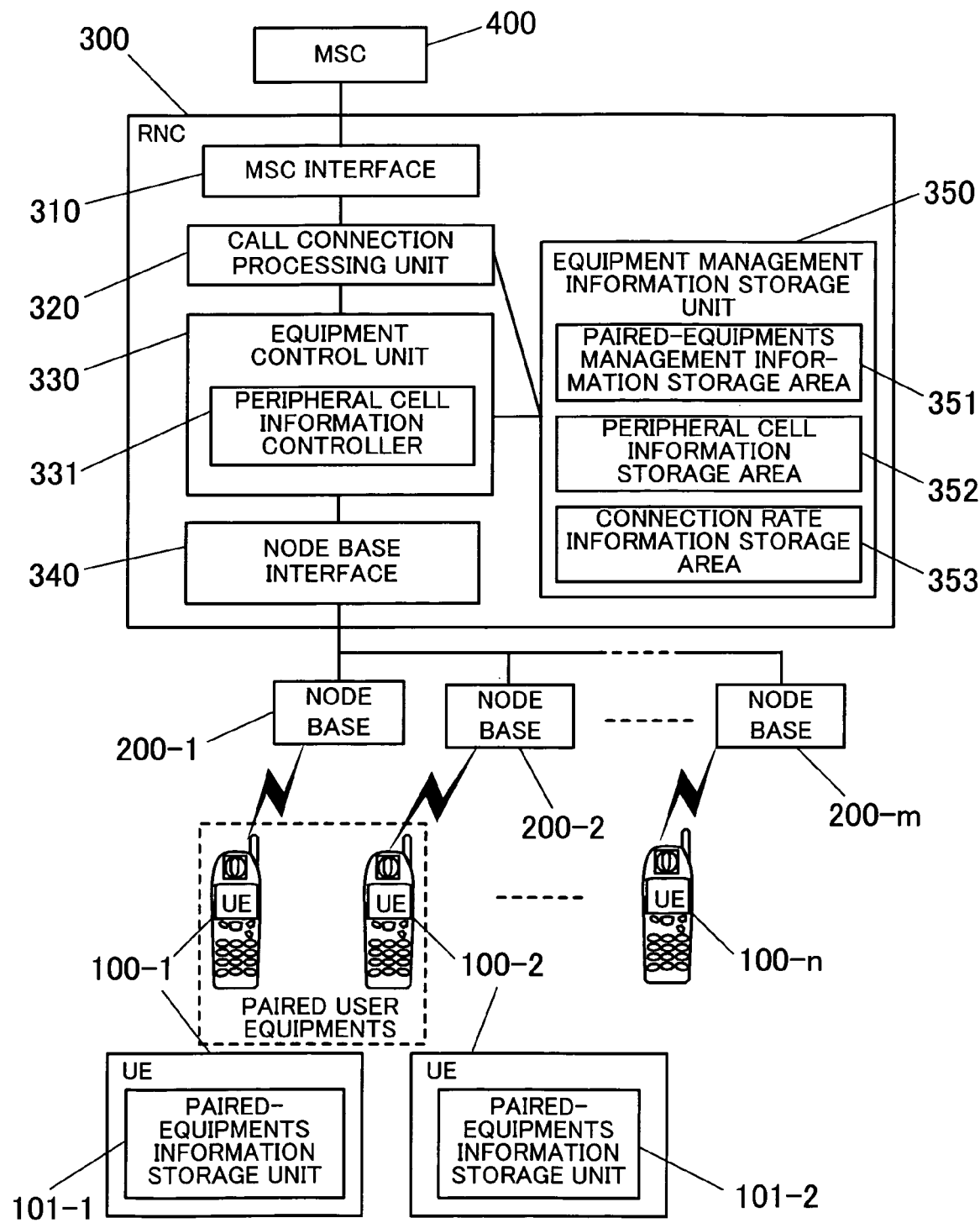
FIG. 1 is a system diagram showing a mobile radio communication system according to a first embodiment of the present invention.

FIG. 1 is a diagram showing a mobile radio communication system according to a first embodiment of the present invention.

This mobile radio communication system according to the first embodiment is arranged to have a plurality of UEs (User Equipment) 100-1, 100-2, . . . , 100-n, a plurality of node bases 200-1, 200-2, . . . , 200-m, a RNC (Radio Network Controller) 300, and a MSC (Mobile Switching Center) 400.

Figure 23:
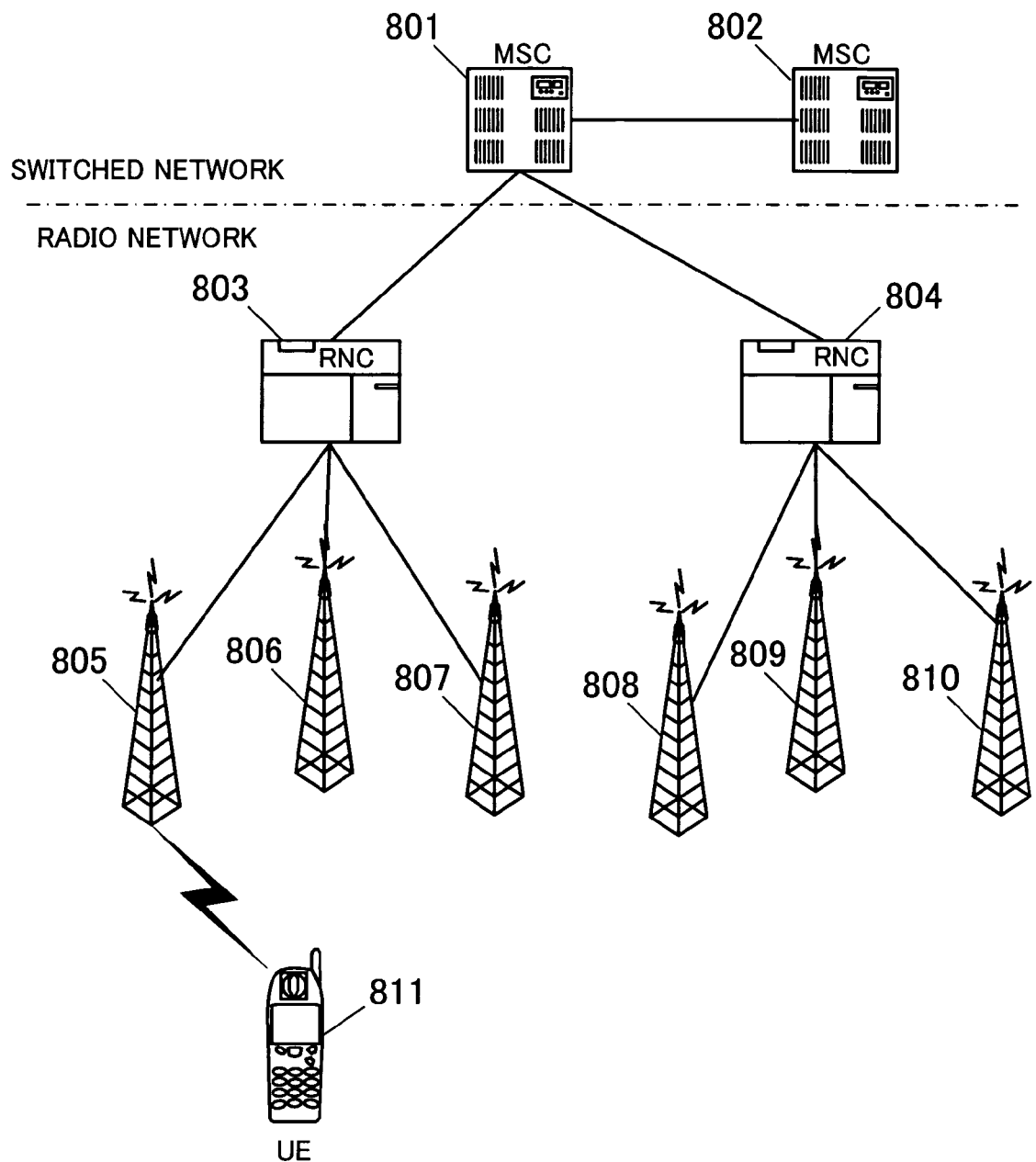
FIG. 23 is a system diagram showing the conventional CDMA system mobile radio communication system.
Figure 24:
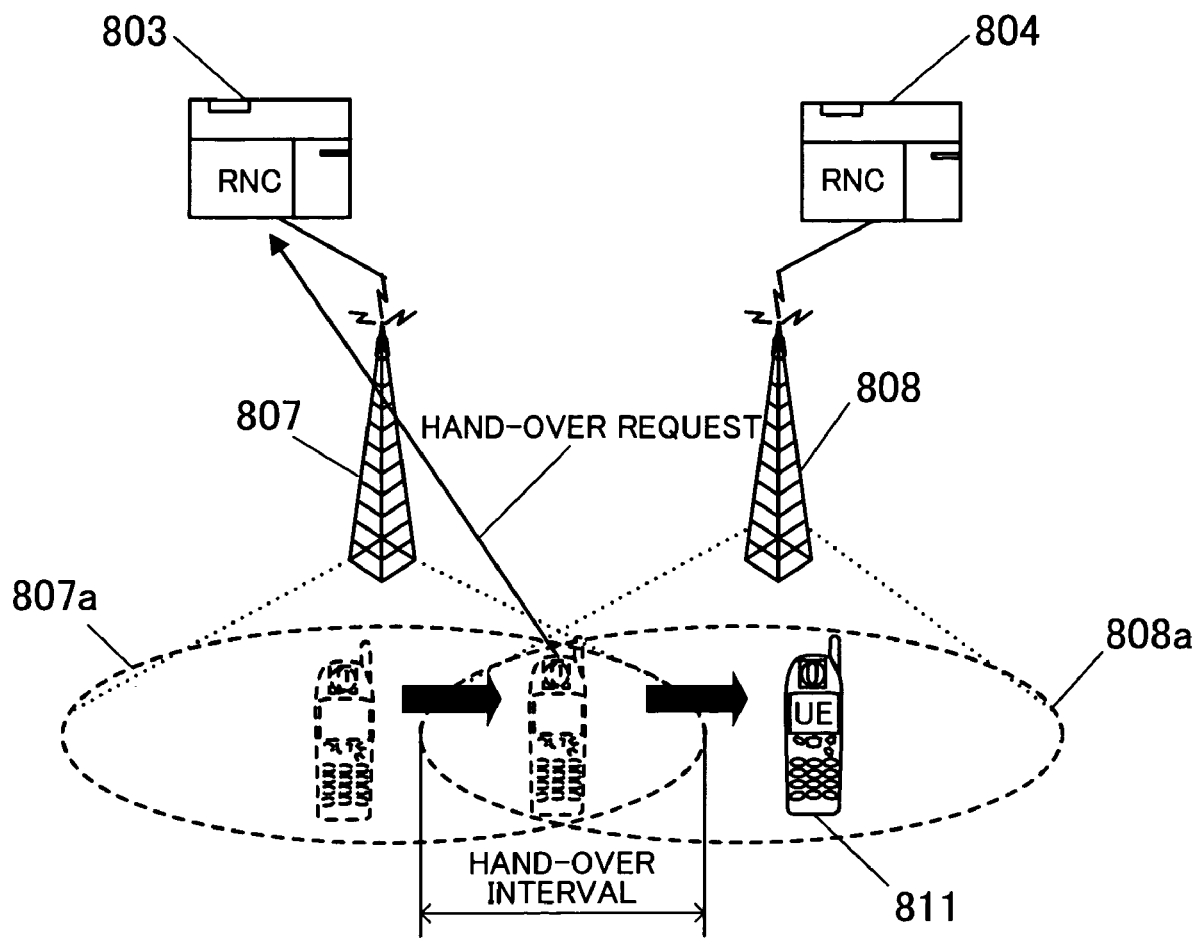
FIG. 24 is a view showing the hand-over operation executed in the movement of the UE.

In FIG. 1, for simplifying the illustration, only one RNC 300 corresponds with one MSC 400. In actual, two or more RNCs 300 and MSCs 400 may be provided (see FIG. 23).

The RNC 300 includes an MSC interface 310, a call connection processing unit 320, an equipment control unit 330, a node base interface 340, and an equipment management information storage unit 350.

The MSC interface 310 has a function of wirelessly communicating with the MSC 400.

The call connection processing unit 320 operates to control the call-connecting and the call-ending operations.

The equipment control unit 330 performs the radio network control for connecting the UEs 100-1, 100-2, . . . , 100-n with the radio network, the hand-over control, the communication rate (connecting rate) control, and so forth. In particular, the equipment control unit 330 includes a peripheral cell information controller 331, which operates to edit the information about the peripheral cells associated when the UEs 100-1, 100-2, . . . , 100-n are moved or generate notice candidates of the peripheral cells to be notified to the UEs 100-1, 100-2, . . . , 100-n.

The node base interface 340 has a function of wirelessly communicating with the node bases 200-1, 200-2, . . . , 200-m.

The equipment management information storage unit 350 stores the management information of the group of the UEs 100-1, 100-2, . . . , 100-n. Hereafter, two UEs 100-1 and 100-2 are paired so that the dual communication is made possible. The group management information of the UEs 100-1, 100-2, . . . , 100-n is called the paired-user-equipments (often referred simply to as the paired-equipments) management information. The paired-equipments management information is stored in a paired-equipments management information storage area 351. The equipment management information storage unit 350 includes a peripheral cell information storage area 352 for storing the information of the peripheral cells around the locations of the UEs 100-1, 100-2, . . . , 100-n and a connecting rate information storage area 353 for storing the connecting rate (communication rate) information of the UEs 100-1, 100-2, . . . , 100-n.

In the mobile ratio communication system shown in FIG. 1, the paired UEs 100-1 and 100-2 include the paired-equipments information storage units 101-1 and 101-2, respectively. These storage units 101-1 and 101-2 store the paired-equipments information for indicating each UE is one of the pair. The UE 100-1 includes as its paired-equipments information the IMSI (International Mobile Subscriber Identify) that is the proper identify information of the other one of the pair, that is, the UE 100-2. For example, it is the phone number of the UE 100-2. Likewise, the other UE 100-2 includes as its paired-equipments information the IMSI that is the UE 100-1 of the other one of the pair. For example, it is the phone number of the UE 100-1. These informations are notified to the RNC 300. The RNC 300 operates to generate the paired-equipments management information based on this paired-equipments information and identifies the pair of the UEs 100-1 and 100-2 in the mobile radio communication system.

In turn, the operation of the mobile radio communication system according to the first embodiment will be described below.

At first, the description will be oriented to the process of enabling the mobile radio communication system to recognize the UEs 100-1 and 100-2 are the paired equipments.

Figure 4:
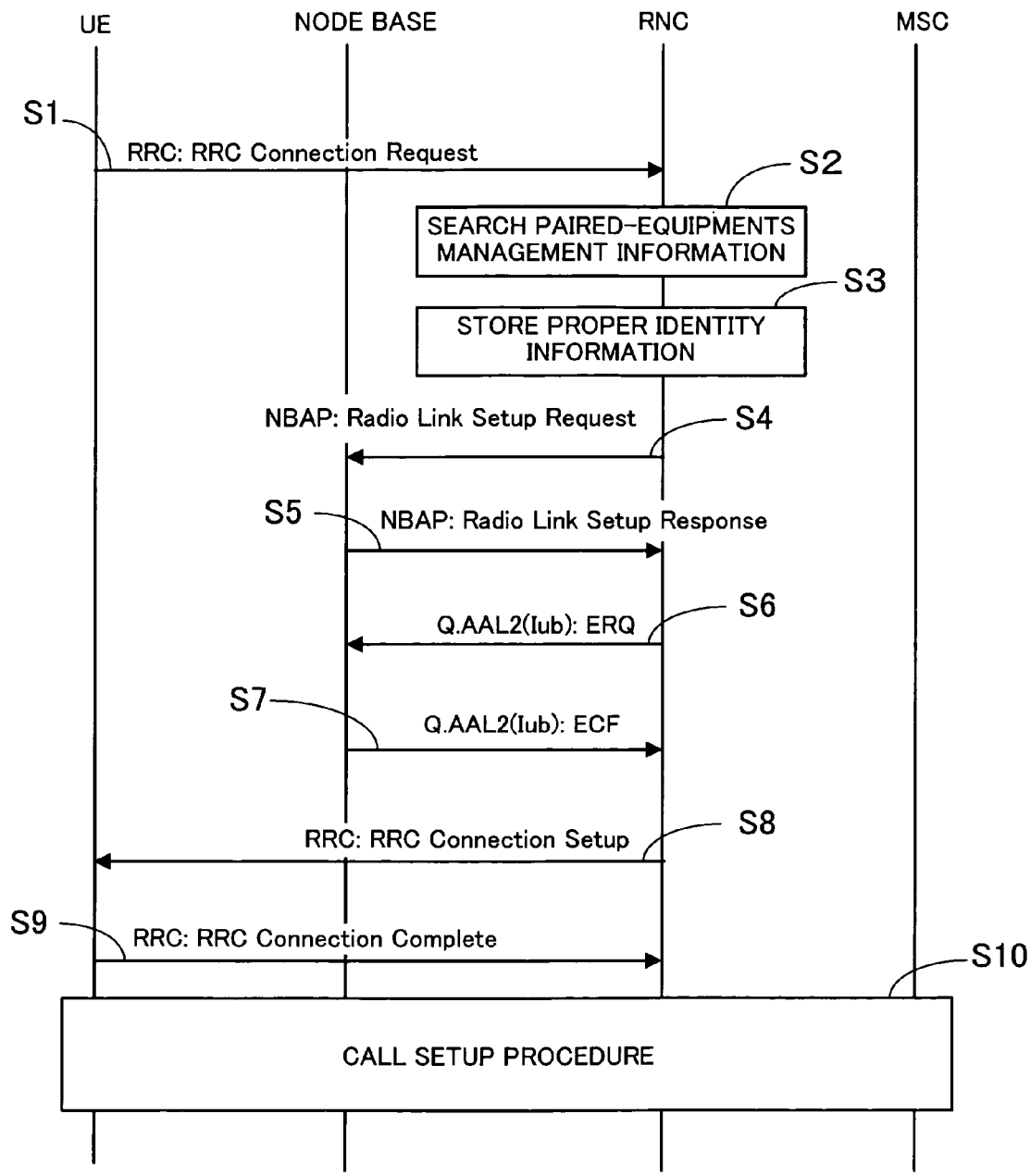
FIG. 4 is a sequence view showing the operation executed when the mobile radio communication system according to the first embodiment originates a call.

FIG. 4 is a sequence view showing the calling operation of the mobile radio communication system.

For example, when a user originates a call with the UE 100-1, the UE 100-1 transmits to the RNC 300 a signal for requesting that the RRC (Radio Resource Control) connection for radio communication is to be established (step S1).

The UE 100-1 adds the IMSI that is the proper identify information of the other one UE 100-2 of the pair to the RRC connection request signal.

Figure 5:
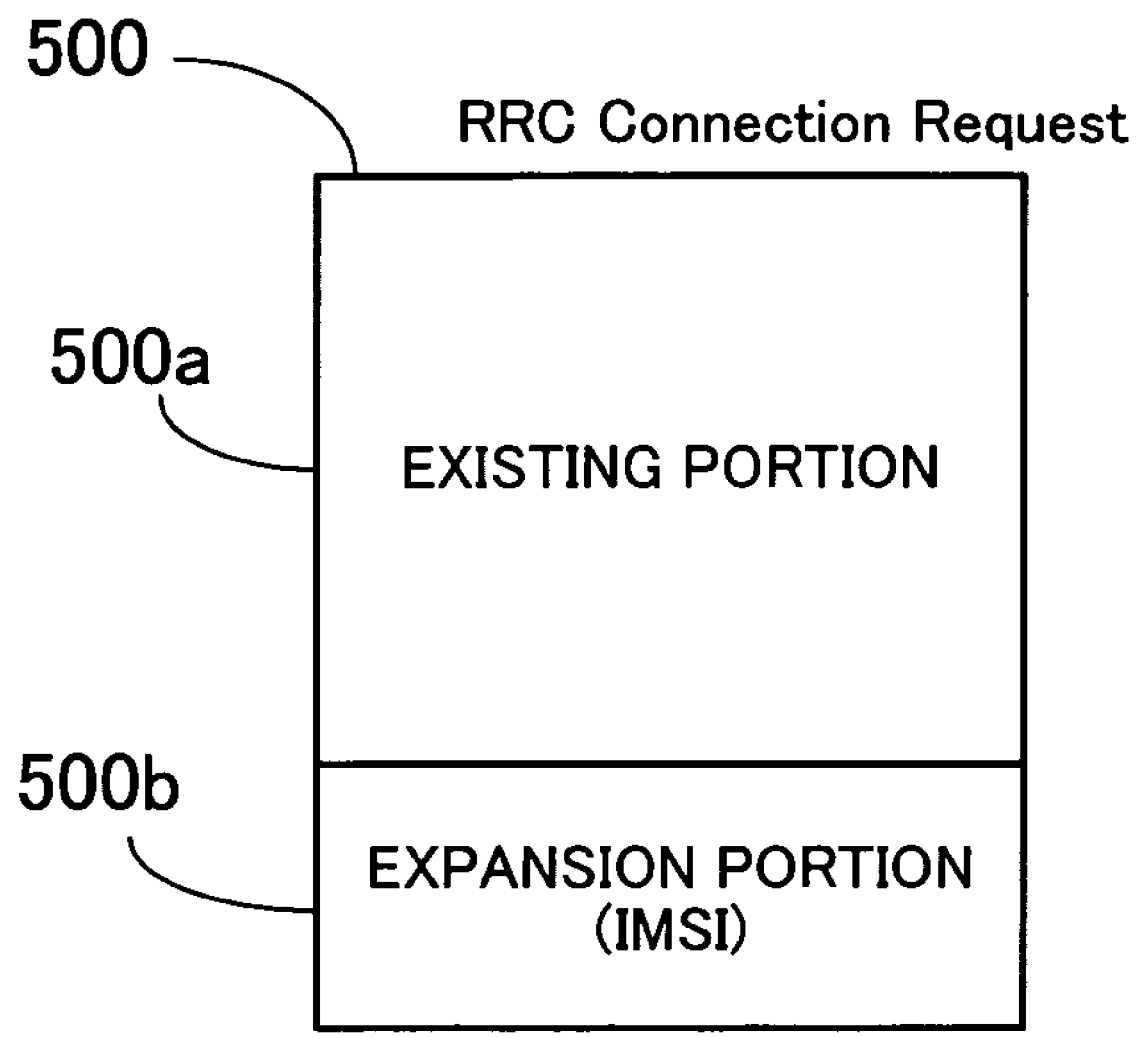
FIG. 5 is a view showing a RRC connection request signal with an IMSI added thereto.

FIG. 5 shows the addition of the IMSI to the RRC connection request signal.

The message 500 of the RRC connection request signal is composed of an existing message (existing portion 500a) by which the UE 100-1 requests the RNC 300 to execute the RRC connection and an expansion portion (IMSI) 500b.

If the RRC connection request signal includes the proper identity information built therein, the RNC 300 operates to search if the paired-equipments information of the UE 100-1 has been already stored in the paired-equipments management information storage area 351 through the use of the equipment control unit 330 (step S2). In this search is used the proper identify information (IMSI) of the UE 100-1, for example.

If not stored, the IMSI of the UE 100-2, which is the paired-equipments information of the UE 100-1 built in the RRC connection request signal, is stored in the paired-equipments management information storage area 351 (step S3).

Figure 6:
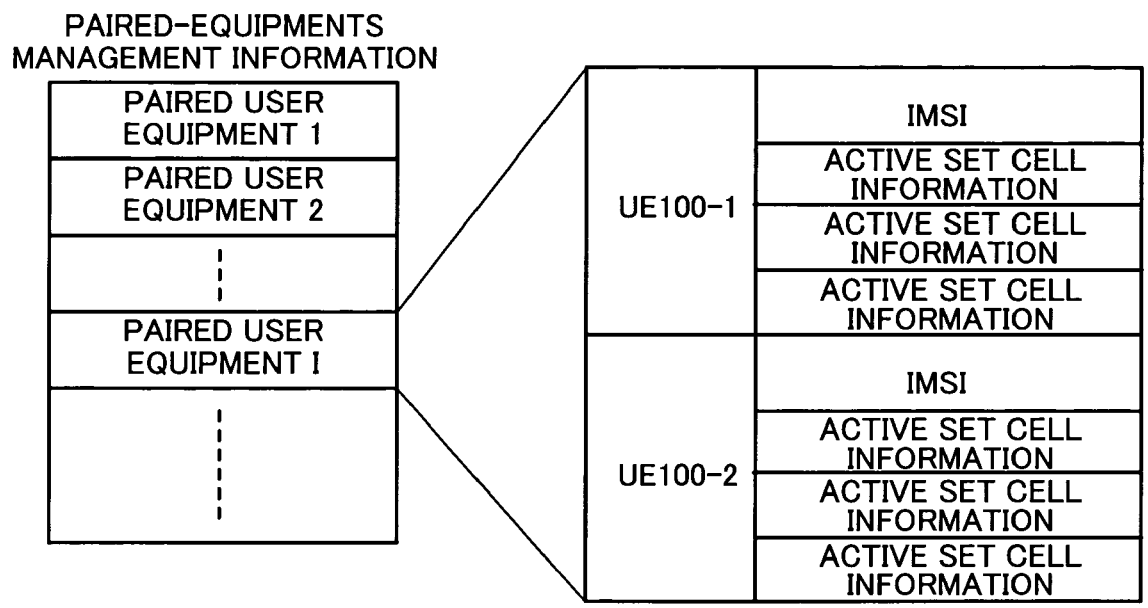
FIG. 6 is a view showing the exemplary management information of paired user equipments.

FIG. 6 shows an example of the paired-equipments management information.

The paired-equipments management information includes the IMSI that is the information of the paired equipments of the UEs 100-1 and 100-2 and the connected cell (referred to as an active set cell) connected in the calling operation process in the call setup procedure (step S10) (to be described below).

After the process of the step S3, the operation is executed to establish the radio link between the ordinary node bases 200-1, 200-2, ..., 200-m and the RNC 300.

Concretely, according to the NBAP (Node Base Application Part) protocol, the operation is executed to establish the radio link between the RNC 300 and the node bases 200-1, 200-2, ..., 200-m. That is, the RNC 300 notifies the node bases 200-1, 200-2, ..., 200-m of the radio link setup request signal (step S4). Then, the node bases 200-1, 200-2, ..., 200-m sends a response for the radio link setup request to the RNC 300 (step S5). Next, the RNC 300 generates a connecting request according to the AAL2 (ATM (Asynchronous Transfer Mode) Adaptation Layer Type 2) protocol and then notifies the node bases 200-1, 200-2, ..., 200-m of the connecting request. More particularly, each request (Q.AAL2 (Iub (that is an interface between the node base and the RNC)) to ERQ (Establish Request)) is transmitted to the node bases 200-1, 200-2, ..., 200-m by the RNC 300 according to the Q.2630.1 signaling also called the Q.AAL2 (step S6). The node bases 200-1, 200-2, ..., 200-m generate the response confirm (Q. AAL2 (Iub): ECF (Establish Confirm)) containing the identifier for each connection of the node base and then transmits the response confirm to the RNC 300 (step S7).

Afterwards, the RNC 300 notifies the UE 100-1 of the RRC connection setup signal (step S8). The UE 100-1 transmits the RRC connection complete signal to the RNC 300 (step S9) in which the RRC connection is completed.

Further, the call setup procedure is executed among the UE 100-1, the node bases 200-1, 200-2, ..., 200-m, the RNC 300, and the MSC 400 (step S10). This procedure allows the call to be connected with the destination mobile user equipment. The information of the active set cell connected with the UE 100-1 in the call connecting process is stored in the paired-equipments management information storage area 351 together with the IMSI that is the proper identify information of the UE 100-1 as shown in FIG. 6.

On the other hand, when the user originates a call with the UE 100-2, the same operation as that of the UE 100-1 is executed. Since the RNC 300 has the IMSI of the UE 100-2 set thereto in the process of searching the paired-equipments management information, the newly storage of the IMSI is not necessary. However, the information of the active set cell connected in the calling process of the call setup procedure (step S10) of the UE 100-2 is stored in the paired-equipments management information storage area 351.

In the CDMA system mobile radio communication system, while the UEs 100-1 and 100-2 are moving, in response to the hand-over request given by the UEs 100-1 and 100-2, the hand-over procedure (multi-cell connecting operation) is executed in sequence. For this purpose, also in response to the foregoing calls of the UEs 100-1 and 100-2, one radio link with one cell is established and then another radio link with another cell is further established. The information of the active set cell connected with the additional radio link is selected from the peripheral cell information held by the UEs 100-1 and 100-2 being in motion and then is stored in the concerned portion of the paired-equipments management information storage area 351 shown in FIG. 6. Assuming that three radio links at maximum are set up for one of the UEs 100-1 and 100-2, for adding a further radio link, in response to the notice from the UEs 100-1 and 100-2, the operation is executed to delete the unnecessary cell and add the notified new cell.

However, in a case that the hand-over operation of the paired user equipments is executed in the conventional hand-over procedure, it involves the following disadvantages. At first, the use of the UEs 100-1 and 100-2 as the paired user equipments probably causes the communication to be executed within the same cell if both of the user equipments are closer to each other. It means that when the radio link of one UE is disconnected, the radio link of the other UE is also probably made unstable. This disadvantageously obtains no benefit of the dualization of the radio link.

Moreover, in a case that the paired equipments are moving in the same direction, the following disadvantage is brought about.

Figure 7:
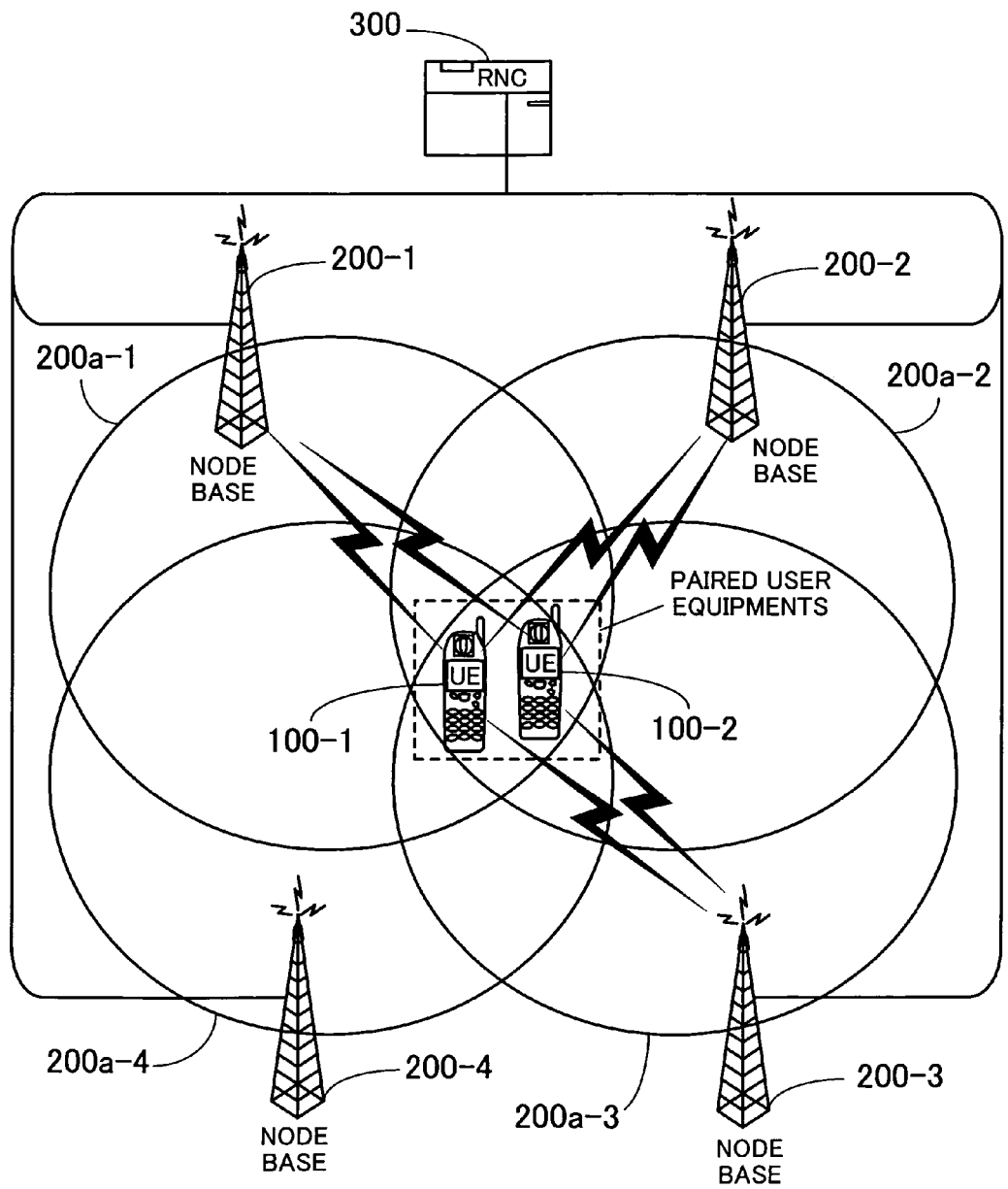
FIG. 7 is a view showing the first hand-over operation of the paired user equipments in the case of the conventional hand-over procedure.
Figure 8:
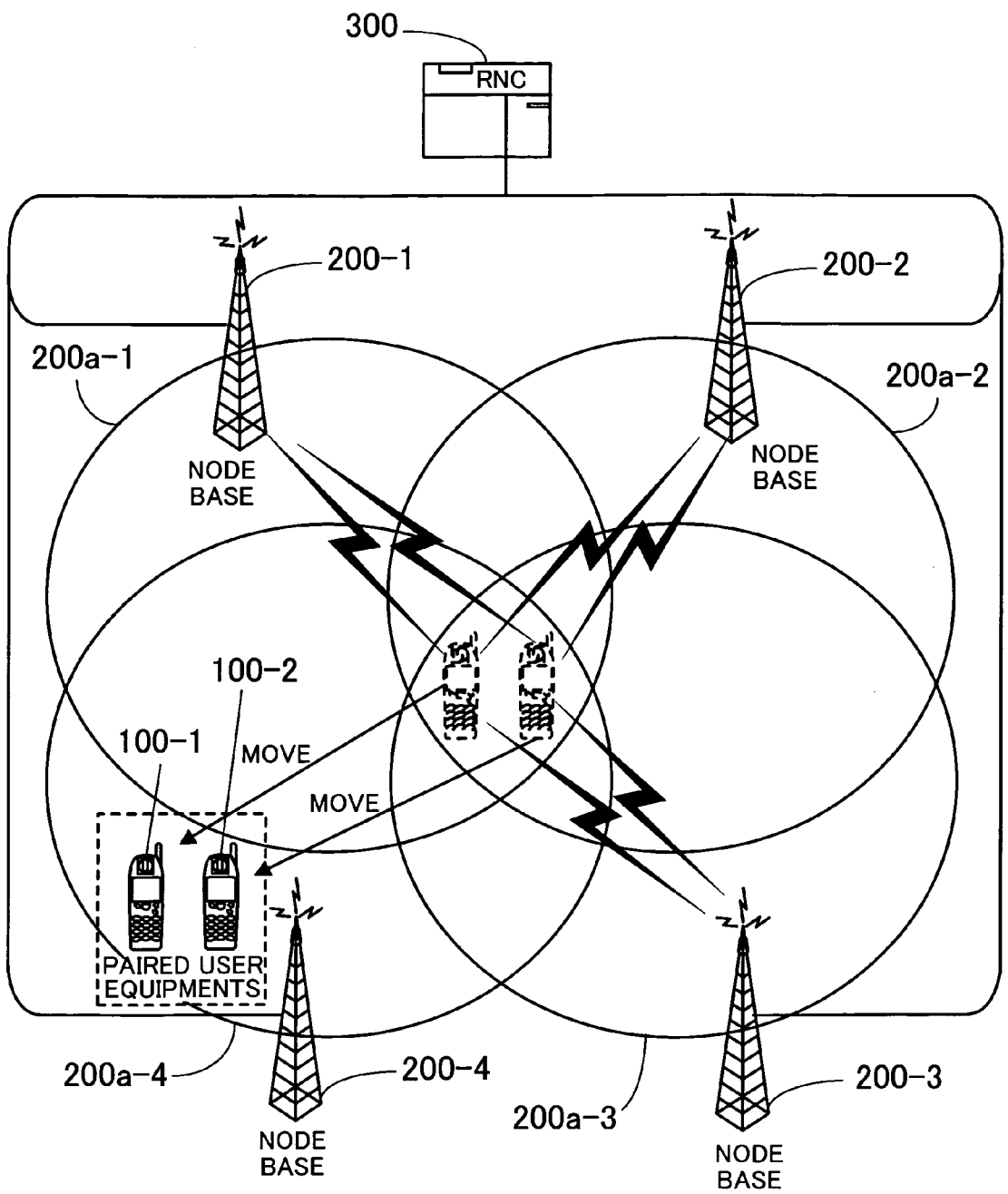
FIG. 8 is a view showing the second hand-over operation of the paired user equipments in the case of the conventional hand-over procedure.
Figure 9:
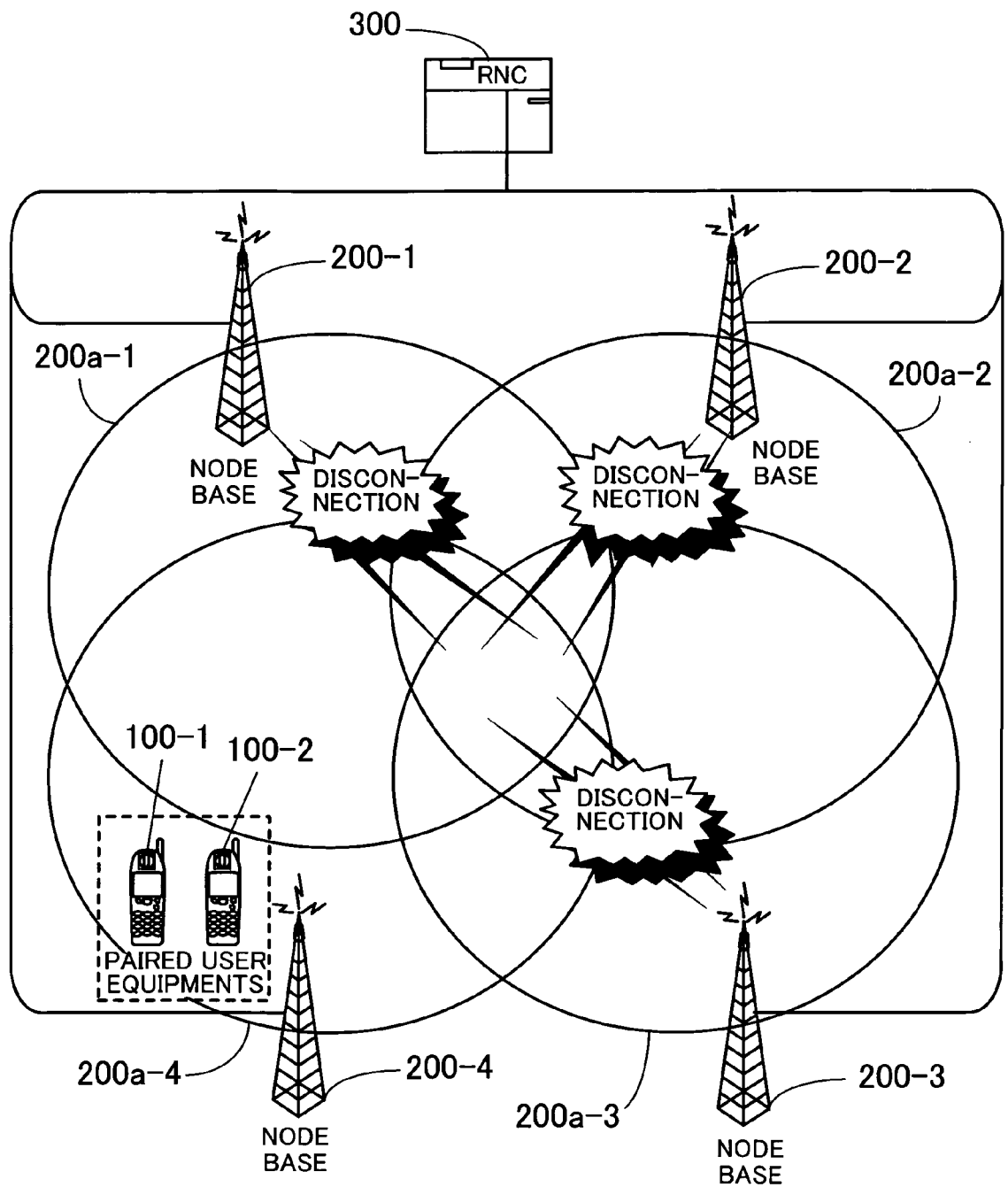
FIG. 9 is a view showing the third hand-over operation of the paired user equipments in the case of the conventional hand-over procedure.

FIGS. 7, 8 and 9 show the hand-over operation of the paired equipments to be executed in the conventional hand-over procedure.

For example, as shown in FIG. 7, it is assumed that the UEs 100-1 and 100-2 are located within the cells 200a-1, 200a-2, 200a-3 and 200a-4, which are formed by the node bases 200-1, 200-2, 200-3 and 200-4 respectively, and the same three radio links with the node bases 200-1, 200-2 and 200-3 are established for both of the UEs. Then, as shown in FIG. 8, when the UEs 100-1 and 100-2 are moving fast, both of the UEs execute the hand-over operation at once. However, if both of the UEs fail in the hand-over operation, all communications may be disconnected as shown in FIG. 9.

In the mobile radio communication system according to the first embodiment, the following process makes it possible to prevent the disconnection of the communication in executing the hand-over operation.

Figure 10:
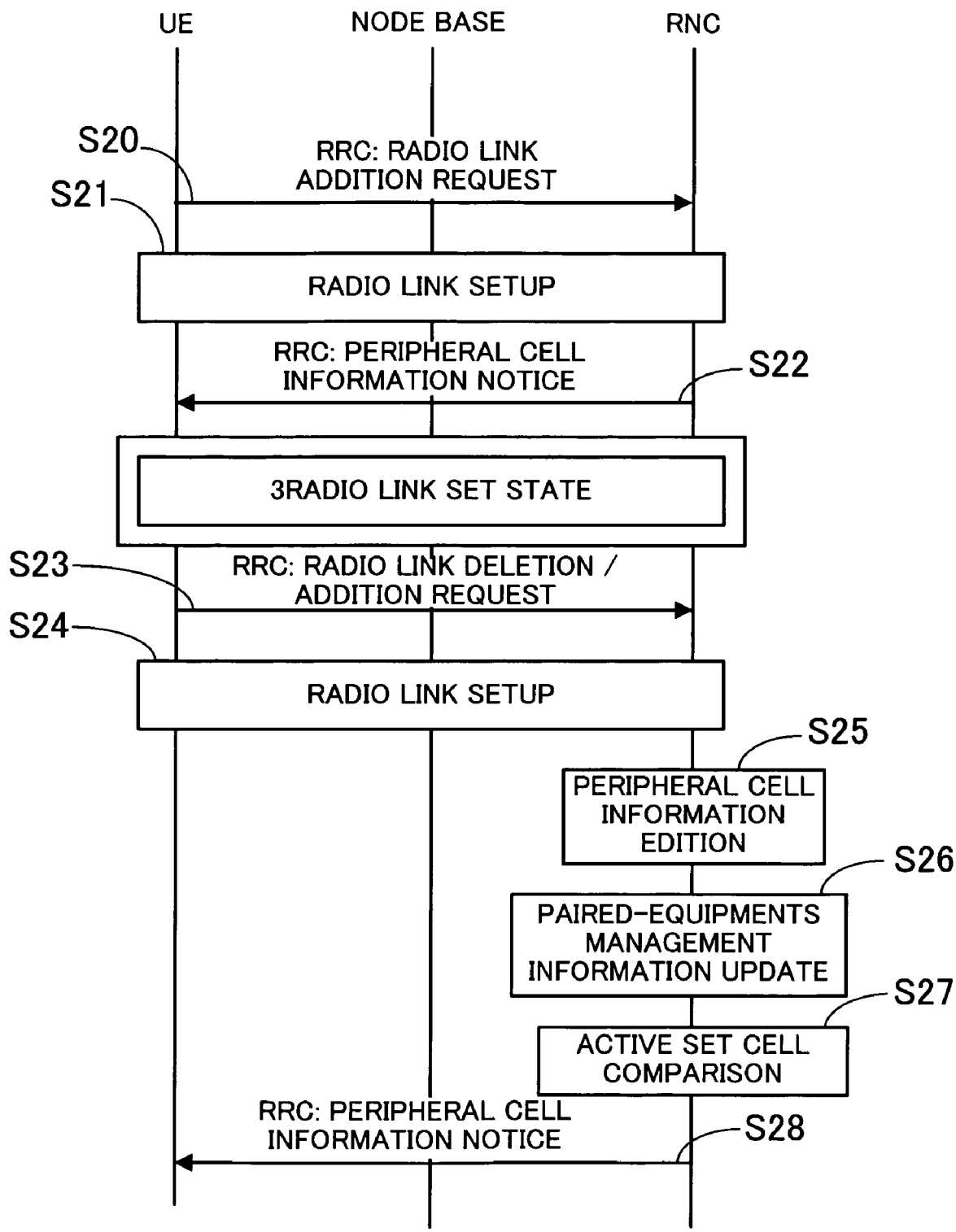
FIG. 10 is a sequence view showing a notice of peripheral cell information in adding a radio link.

FIG. 10 is a sequence view showing the notice of the peripheral cell information in adding the radio link.

When a request for adding a radio link is notified by the UEs 100-1 and 100-2 in association with the movement of the UEs 100-1 and 100-2 (step S20), the RNC 300 performs the process of setting up the radio link (step S21). Afterwards, the peripheral cell information controller 331 searches the peripheral cell information from the peripheral cell information storage area 352, the peripheral cell information being used for monitoring the radio state of the next destination cell candidate after the hand-over operation, and then notifies the UEs 100-1 and 100-2 of the peripheral cell information (step S22).

FIG. 11 shows an example of the peripheral cell information.

As shown, the peripheral cell information includes a peripheral cell ID (cell_id) of a certain UE (that is hereafter assumed to be UE 100-1) and whether or not the cell is connectable with the UE 100-1 through the radio link about each of the three possible radio links (RL#1, RL#2 and RL#3) of the UE 100-1. If the cell is connectable with the UE 100-1 through the radio link, it indicates ON. Further, the number of the radio links with which the cell is connectable is managed as the number of related links. Herein, for the actually connected active set cell, the "activeSet" is noted in the column of the related link number.

In this embodiment, the active set cell are the cells with the cell IDs of 257 (number 0), 7939 (number 20), and 3844 (number 24).

FIG. 12 shows the candidates of the peripheral cell information to be notified to the mobile user equipment.

As the peripheral cell candidates whose information is to be notified, the active set cells are selected in the upper rank, followed by the cells with three related links.

While three radio links are established for the UE 100-1, if a new radio link is set up when the UE 100-1 is moved, it is necessary to disconnect a certain radio link. In such a case, the UE 100-1 transmits the radio link deletion/addition request to the RNC 300 (step S23) The RNC 300 performs the process of setting up the radio link (step S24). The peripheral cell information controller 331 of the RNC 300 edits the peripheral cell information (step S25).

FIG. 13 shows an example of the peripheral cell information in deleting or adding the radio link.

When a radio link deletion/addition request is issued, the peripheral cell information controller 331 deletes the information of the radio link "RL#2" from the peripheral cell information shown in FIG. 12, adds a new radio link "RL#4" thereto, and adds the information of the cells to be connected with the radio link "RL#4". In the table shown in FIG. 13, the cell with the cell ID of "7939" (number 20) is not made to be the active set cell, while the cell with the cell ID of "11522" (number 18) is newly made to be the active set cell. Further, based on the active set cell determined on the peripheral cell information controller 331, the equipment control unit 330 updates the paired-equipments management information shown in FIG. 4 (step S26). The foregoing process holds true to the other paired UE 100-2 of the UE 100-1.

Then, the peripheral cell information control unit 331 compares the active set cell of the paired-equipments management information of the UE 100-1 with that of the UE 100-2 (step S27). In a case that the compared result indicates that the three active set cells of the paired-equipments management information of one UE do not coincide with those of the other UE, basically, neither of the communications of the UEs 100-1 and 100-2 are disconnected at a time. Hence, based on the peripheral cell information edited as shown in FIG. 13, the peripheral cell information control unit 331 searches the information of the peripheral cell as the next destination cell candidate after the hand-over operation and then notifies the UEs 100-1 and 100-2 of the searched peripheral cell information. This searched information is used for monitoring the radio state (step 28).

FIG. 14 shows the peripheral cell candidates whose information is to be notified to the mobile user equipment.

As the peripheral cell candidates whose information is to be notified, the active set cells are selected in the upper rank, followed by the cells with three related links. The cell (cell ID is "7939" (number 20) that has been the active set cell before movement is made to be the peripheral cell of the active set cell to be connected through the radio link after movement. In actual, hence, that cell is included in the candidate cells whose information is to be notified.

On the other hand, in a case that the compared result of the active set cells of the paired-equipments management information between the pair of UEs in the step S27 indicates that the three active set cells of the paired-equipments management information of one UE coincide with those of the other UE, the peripheral cell information control unit 331 deletes the cell with its ID of "7939" (number 22), for example, from the candidate cells and then notifies the UE 100-2 of the deletion. In the pair of UEs 100-1 and 100-2, in a case that the change of the candidate cells causes the UE 100-1 to change the cell with its ID of "7939" into the active set cell again, the UEs 100-1 and 100-2 are connected with the respective cells for executing their communications. This thus prevents the simultaneous disconnection of the radio links of the UEs 100-1 and 100-2 even in the fast movement of those UEs. Either one of the UEs keeps the communication active, so that the high-quality dual communication may be made possible.

In turn, the description will be oriented to the mobile radio communication system according to the second embodiment of the invention.

Figure 15:
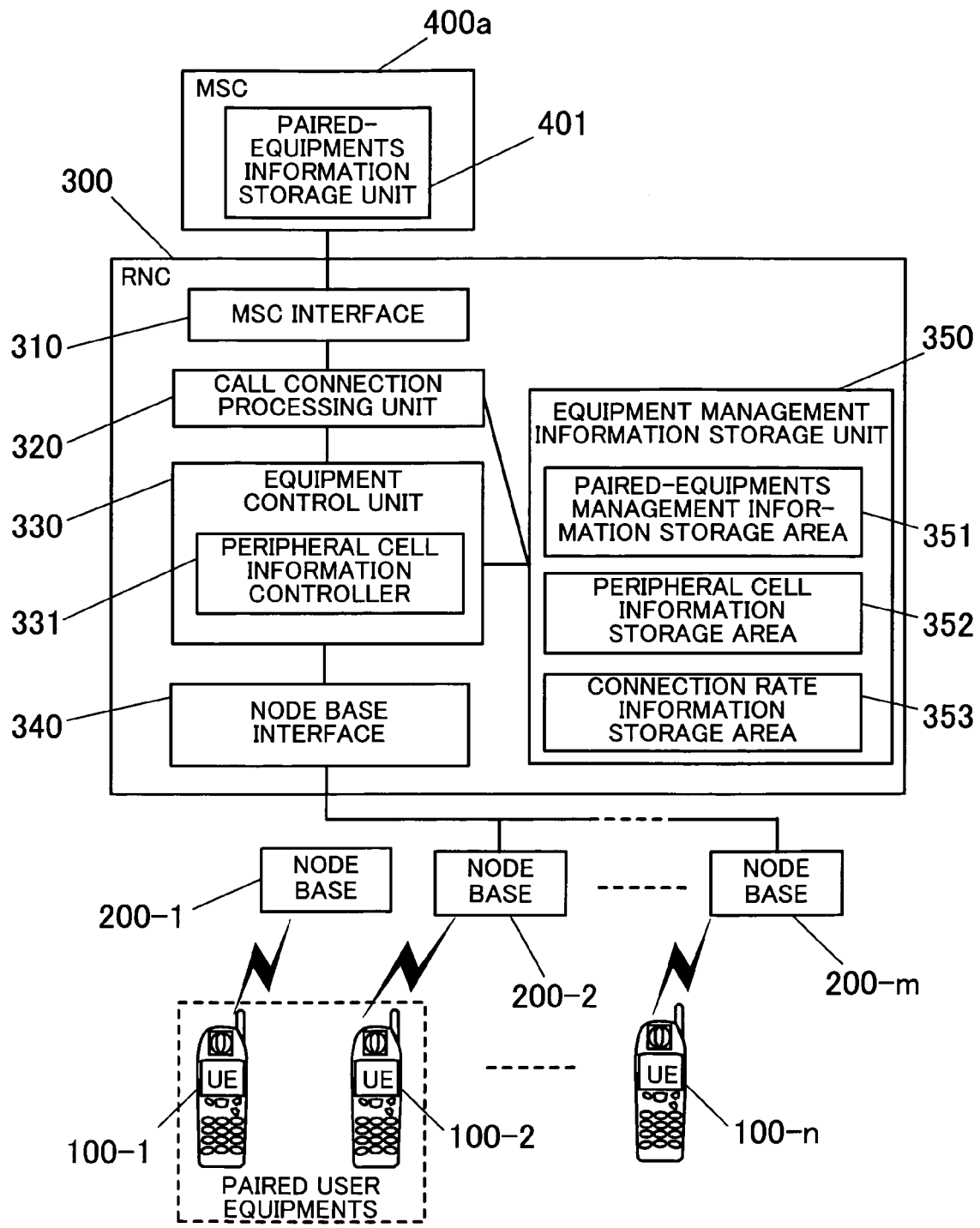
FIG. 15 is a system diagram showing a mobile radio communication system according to a second embodiment of the present invention.

FIG. 15 is a diagram showing the mobile radio communication system according to the second embodiment.

In the mobile radio communication system of the second embodiment, unlike the system of the first embodiment shown in FIG. 1, the paired-equipments information of the pair of UEs 100-1 and 100-2 is included in a paired-equipments information storage unit 401 located in the MSC 400a. This paired-equipments information is notified to the RNC 300. The RNC 300 generates the paired-equipments management information based on the information and thereby identifies the pair of UEs 100-1 and 100-2 in the mobile radio communication system. The other components of the system of the second embodiment are the same as those of the system of the first embodiment. Hence, the other components are denoted by the same reference numbers and thus are not descriptive herein.

The communication system of the second embodiment has the different process of enabling the system itself to recognize the UEs 100-1 and 100-2 as a pair from the communication system of the first embodiment. Hence, this process will be described below.

Figure 16:
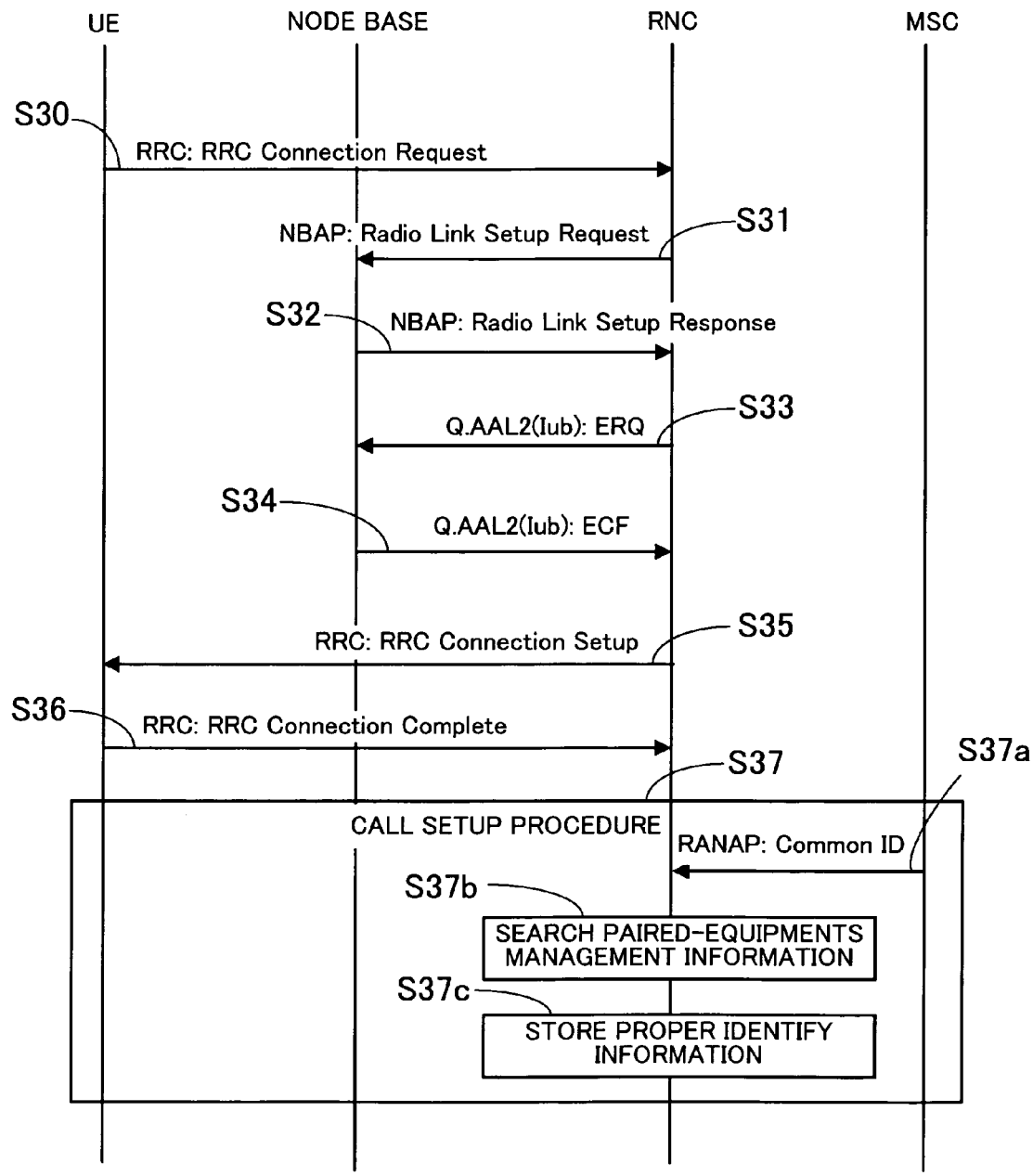
FIG. 16 is a sequence view showing the operation to be executed when the mobile radio communication system of the second embodiment originates a call.

FIG. 16 is a sequence view showing the operation to be executed when the communication system of the second embodiment originates a call.

For example, in a case that the user originates a call with the UE 100-1, the UE 100-1 transmits to the RNC 300 a signal for requesting the RCC connection setup (referred to as the RRC connection request), the RCC connection being used for radio communications (step S30). The process of the steps S31 to S36 is the same as the process of the steps S4 to S9 shown in FIG. 4. In the system of the second embodiment, the foregoing paired-equipments information is added to the message included in the call setup procedure of the step S37. Concretely, the MSC 400a adds the proper identity information (IMSI) of the UE 100-2 that is the other one of the UE 100-1 to the RANAP (Radio Access Network Application Part) protocol signal Common ID (proper identity information of the destination mobile user equipment) and then notifies the RNC 300 of the added result (step S37a). The RNC 300 receives the added result through the MSC interface 310. Then, the equipment control unit 330 searches the paired-equipments management information of the paired-equipments management information storage area 351 as shown in FIG. 6 (step S37b) and puts the proper identity information in the paired-equipments management information storage area 351 if the paired-equipments management information is not stored (step S37c).

As noted above, even if the paired-equipments information is provided in the MSC 400a, the communication system of the second embodiment offers the same effect as the system of the first embodiment.

In turn, the description will be oriented to the mobile radio communication system according to the third embodiment of the invention.

The mobile radio communication system of the third embodiment has the same arrangement as the system shown in FIG. 1 or 15 except the function of the peripheral cell information controller 331 of the equipment control unit 330. Hereafter, assuming that the system of the third embodiment is the same as the system of the first embodiment, that is, the paired-equipments information is stored in the UEs 100-1 and 100-2, the operation of the mobile radio communication system of the third embodiment will be described with reference to FIG. 1.

Figure 17:
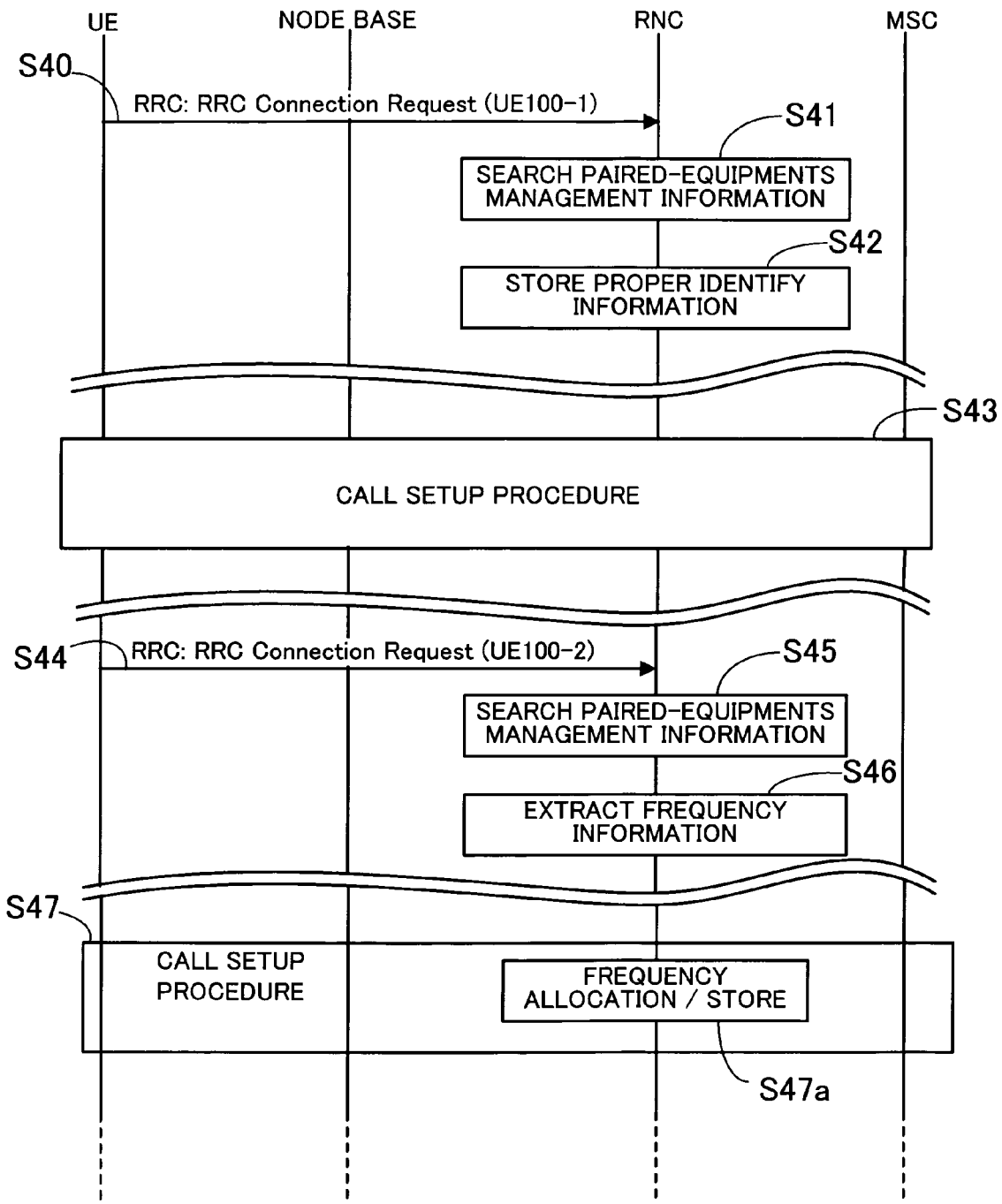
FIG. 17 is a sequence view showing the operation to be executed when a mobile radio communication system of a third embodiment originates a call.

FIG. 17 is a sequence view showing the operation to be executed when the communication system of the third embodiment originates a call.

The process of FIG. 17 does not include the process of the steps S4 to S9 of the system of the first embodiment. Further, the process of the steps S40 to S43 to be executed when the user originates a call with the UE 100-1 corresponds with the process of the steps S1 to S3 and S10. The call setup procedure (step S43) in the call of the UE 100-1 concretely concerns with the following operation. The peripheral cell information controller 331 searches the peripheral cell information of the UE 100-1 from the peripheral cell information storage area 352 of the equipment management information storage unit 350. Then, any frequency band to be used for the radio communication is allocated to the UE 100-1. Next, the connected active set cell is stored as the paired-equipments management information related with the UE 100-1.

The operation to be executed when the user originates a call with the UE 100-2 is different from that of the system of the first embodiment. When the UE 100-2 transmits a RCC connection request signal, the RCC connection being required for the radio communication, to the RNC 300 (step S44), the RNC 300 searches the paired-equipments management information from the paired-equipments management information storage area 351 (step S45). At this time, the IMSI of the UE 100-2 has been already set in the process of the step S42. Hence, it is not necessary to newly store the IMSI. Further, the peripheral cell information controller 331 extracts the frequency information included in the active set cell of the UE 100-1 located in the paired-equipments management information storage area 351 related with the UE 100-2 (step S46). In the subsequent call set procedure (step S47) of the UE 100-2, the operation is executed to refer to the frequency information of the UE 100-1 extracted in the process of the step S46, allocate the different frequency band from the frequency of the UE 100-1, and then store the active set cell information in the paired-equipments management information storage area 351 related with the UE 100-2 (step S47a).

As described above, the communication system of the third embodiment allows each of the paired equipments to be connected with the corresponding cell of its own frequency band. This thus prevents simultaneous disconnection of the networks of the UEs 100-1 and 100-2 even in the fast movement of the UEs. Hence, any one of the mobile user equipments can keep the continuous communication, so that the high-quality dual communication is made possible.

In turn, the description will be oriented to the mobile radio communication system according to the fourth embodiment of the invention.

The communication system of the fourth embodiment has the same arrangement as the arrangement shown in FIG. 1 or 15. Hereafter, this system will be described with reference to FIG. 1. However, the paired-equipments management information storage area 351 stores the equipment priority information for specifying a priority of each of the pair. Moreover, the peripheral cell information controller 331 of the equipment control unit 330 has the different function as well.

A higher priority (referred to as a priority A) is put on one of the pair of UE 100-1 and 100-2 that originates a call first. A lower priority (referred to as a priority B) is put on the other of the pair that originates a call second.

The operation of the system of the fourth embodiment will be described with reference to FIG. 1.

Considering that the UE 100-1 originates a call, when the equipment control unit 330 recognizes the calling of the UE 100-1, the equipment control unit 330 refers to the paired-equipments management information storage area 351 for searching the information of the UE 100-2 that is the other one of the pair. If the UE 100-2 does not originate a call, the priority A is put on the UE 100-1 and then is stored as the equipment priority information of the UE 100-1 in the paired-equipment management information storage area 351. Afterwards, when the UE 100-2 originates a call, since the priority A has been put on the UE 100-1 having originated a call, the priority B is put on the UE 100-2 and then is stored as the equipment priority information of the UE 100-2 in the paired-equipments management information storage area 351.

The operation of noticing the peripheral cell to be executed in adding a radio link is substantially expanded along the sequence of the peripheral cell information notice to be executed in adding a radio link as shown in FIG. 10. Hence, the operation will be described with reference to the sequence view of FIG. 10.

In a case that the UE 100-1 with the priority A transmits a request for deleting and adding a radio link to the RNC 300 when three radio links of the UE 100-1 are established (step S23), the RNC 300 executes the process of setting up a radio link (step S24) and the peripheral cell information controller 331 edits the peripheral cell information in the peripheral cell information storage area 352 (step S25).

The priority-based edition of the peripheral cell information by the peripheral cell information controller 331 will be described with reference to FIGS. 13 and 14.

When the UE issues a request for deleting or adding a radio link, the peripheral cell information controller 331 deletes the information about the radio link "RL#2" from the peripheral cell information shown in FIG. 13, newly adds the radio link "RL#4" and the information of the cells to be connected with the radio link "RL#4" to the peripheral cell information shown in FIG. 13. In the illustration of FIG. 13, the cell with its ID of "7939" (number 20) is not made to be the active set cell, while the cell with its ID of "11522" (number 18) is newly made to be the active set cell. Further, the equipment control unit 330 updates the paired-equipments management information shown in FIG. 6 based on the active set cell determined by the peripheral cell information controller 331 (step S26).

In a case that the UE 100-2 with the priority B deletes the information of the radio link "RL#2" and newly adds the radio link "RL#4" when three radio links of the UE 100-2 are established, the peripheral information controller 331 selects the cell with its ID of "7939" (number 22) as a notice candidate with respect to the UE 100-1 with the priority A but deletes that cell from the notice candidates with respect to the UE 100-2 with the priority B. In a case that the UE 100-1 returns the cell with its ID of "7939" to be active by changing the notice candidate cell, the pair of the UEs 100-1 and 100-2 are connected with their respective cells for the purpose of doing the communications through their respective cells. This thus prevents simultaneous disconnection of the networks of the UEs 100-1 and 100-2 even in the fast movement of these UEs. It means that at least one of the pair may keep well-communicated at any time, so that the high-quality dual communication is made possible.

In the foregoing first to the fourth embodiments, the RNC 300 may include every function of the peripheral cell information controller 331 in the form of algorithm. That is, in the communication systems of the first and the second embodiments, the active set cell informations of the pair of equipments are extracted from the paired-equipments management information storage area 351 and compared with each other. If both are matched, the algorithm for generating the different peripheral cell information, the algorithm for allocating a different frequency band to each of the pair, proposed in the third embodiment, and the algorithm for generating the corresponding peripheral cell information with each priority of the paired equipments, proposed in the fourth embodiment, all of which are included in the RNC 300, may be selectively executed. However, if the UEs 100-1 to 100-$n$ are not paired, the ordinary peripheral cell information selecting algorithm may be used.

Further, one of these algorithms may be applied to one of the pair and another may be applied to the other. This application of the algorithms will be embodied in the mobile radio communication system according to the fifth embodiment of the invention, which will be described below.

The communication system of the fifth embodiment has the same arrangement as that shown in FIG. 1 or 15, except that the paired-equipments management information storage area 351 stores the algorithms to be applied to the pair of UEs 100-1 and 100-2.

Figure 18:
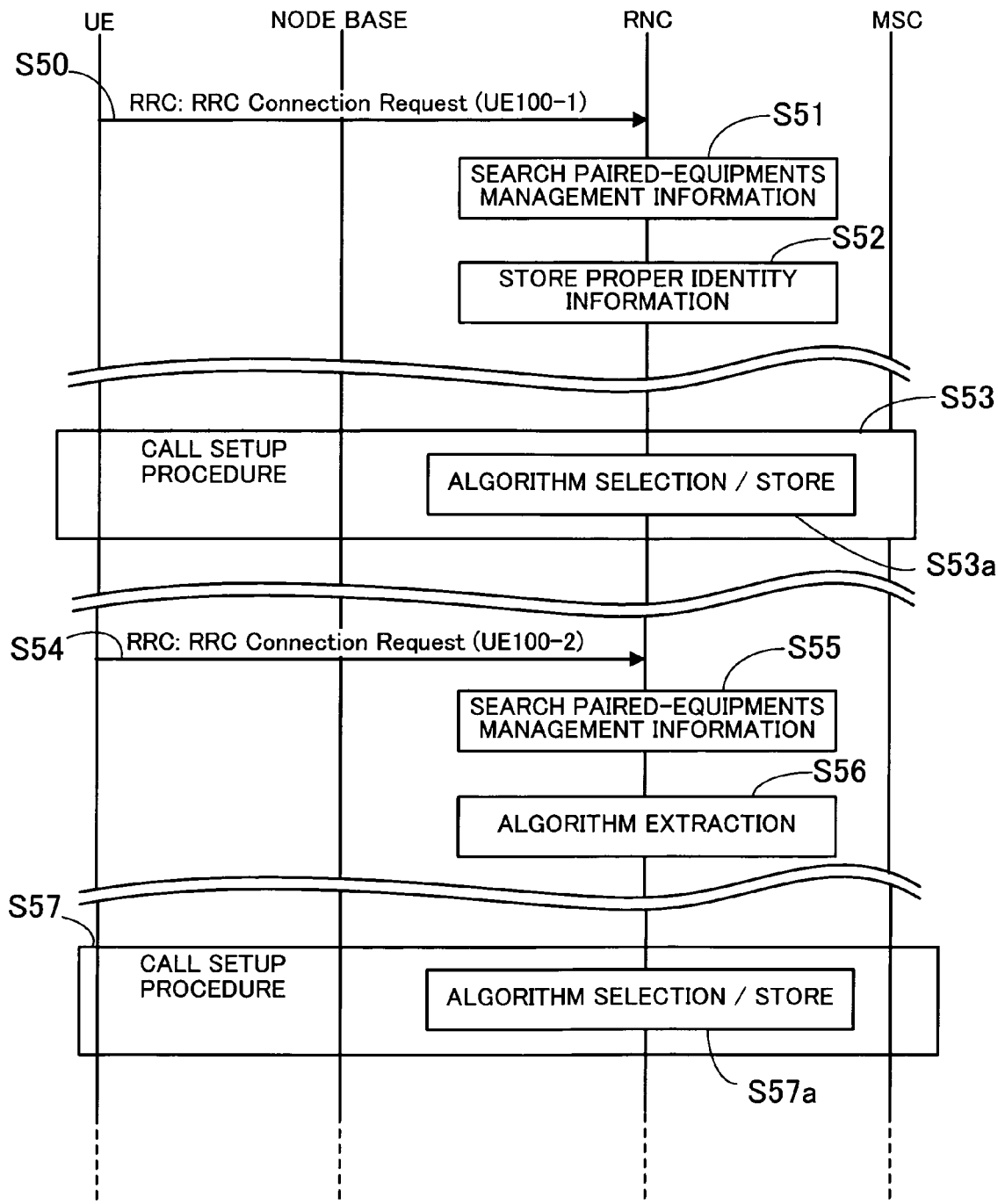
FIG. 18 is a sequence view showing the operation to be executed when a mobile radio communication system of a fifth embodiment originates a call.

FIG. 18 is a sequence view showing an operation to be executed when the communication system of the fifth embodiment originates a call.

The process of the steps S4 to S9 of the system of the first embodiment as shown in FIG. 4 is not illustrated in FIG. 18. The process of the steps S50 to S52 to be executed when the UE 100-1 originates a call corresponds with the process of the steps S1 to S3. In the call setup procedure (step S53) to be executed when the UE 100-1 originates a call, the peripheral cell information controller 331 of the RNC 300 selects the algorithm to be applied to the UE 100-1 from a plurality of peripheral cell information selecting algorithms and stores the algorithm in the paired-equipments management information storage area 351 (step S53$a$).

Figure 19:
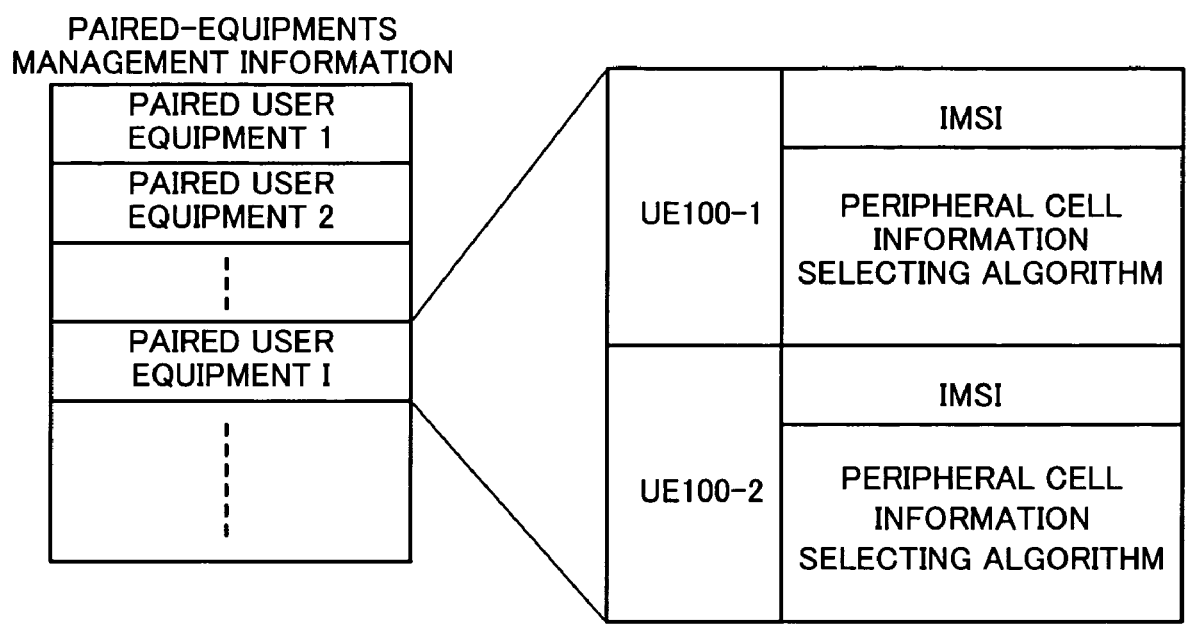
FIG. 19 is a view showing an example of management information of the paired user equipments.

FIG. 19 shows the exemplary paired-equipments management information.

As shown, the paired-equipments management information includes the IMSIs, that is, the information of the pair of UEs 100-1 and 100-2, and the peripheral cell information selecting algorithm selected by the process of the step S53$a$.

In the call setup procedure (step S53), the selected algorithm is executed to connect the UE 100-1 with RNC 300 and notify the UE 100-1 of the peripheral cell information.

On the other hand, in a case that the user originates a call with the UE 100-2, the UE 100-2 transmits a signal for requesting the RRC connection to be established (a RRC connection request signal), the RRC connection being used for the radio communication, to the RNC 300 (step S54). The RNC 300 searches the paired-equipments management information from the paired-equipments management information storage are 351 (step S55). At this time, since the IMSI of the UE 100-2 has been already set in the process of the step S52, it is not necessary to newly store the IMSI. Further, the peripheral cell information controller 331 extracts the peripheral information selecting algorithm selected by the UE 100-1 from the paired-equipments management information storage area 351 related with the UE 100-2 (step S56). In the subsequent call processing procedure of the UE 100-2 (step S57), the operation is executed to select the different algorithm from the algorithm to be applied to the UE 100-1 extracted in the process of the step S56 and put the selected algorithm in the paired-equipments management information storage area 351 (step S57$a$).

As described above, a plurality of peripheral cell information selecting algorithms each of which has its own feature are prepared so that the proper algorithm may be selectively applied to each of the paired user equipments. This may thus makes the peripheral cell information selecting algorithm for dual communications redundant and improve the communication quality. For example, the selective application of the algorithms, each of which is proper to the communications in fast movement or those in slow movement, makes it possible to cover a wide range of mobile communications.

In turn, the description will be oriented to the mobile radio communication system according to the sixth embodiment of the invention.

Figure 20:
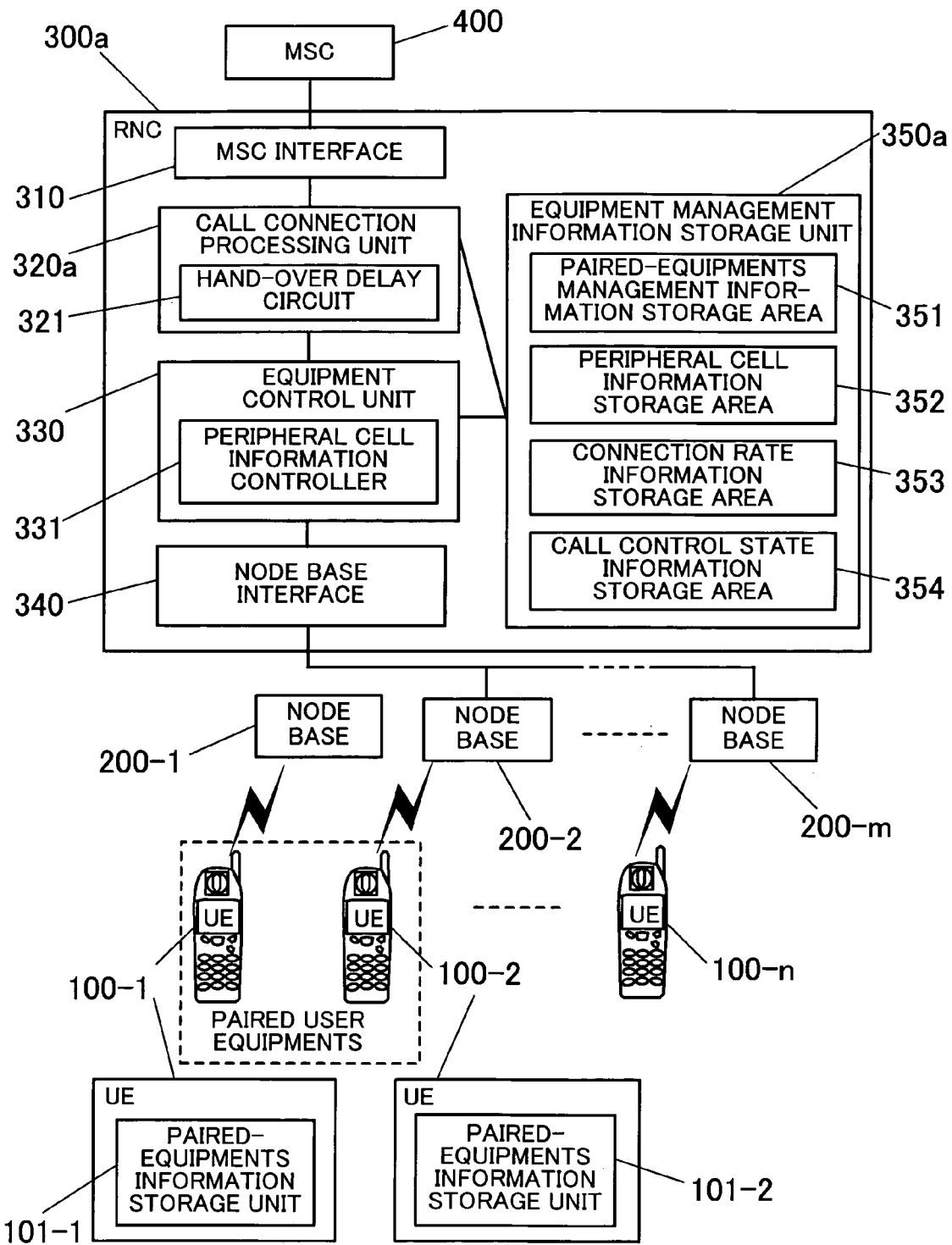
FIG. 20 is a system diagram showing a mobile radio communication system according to a sixth embodiment of the present invention.

FIG. 20 is a diagram showing the communication system of the sixth embodiment.

Herein, the description will be expanded in the case that the system of the sixth embodiment is the same as the system of the first embodiment shown in FIG. 1, concretely, the paired-equipments information is stored in the UEs 100-1 and 100-2. This holds true to the storage of the paired-equipments information shown in FIG. 15 in the MSC 400. Further, the same components of the system of the sixth embodiment as those of the system shown in FIG. 1 are denoted by the same reference numbers and thus are not described below.

In the mobile radio communication system of the sixth embodiment, the call connection processing unit 320$a$ of the RNC 300$a$ includes a hand-over delay circuit 321 for delaying the hand-over operation when the hand-over request is issued by the pair of UE 100-1 and 100-2. Further, the equipment management information storage unit 350$a$ includes a call control state information storage area 354 for storing a call control state such as whether or not the UE 100-1 to 100-n is being handed over.

Hereafter, the description will be oriented to the operation of the mobile radio communication system according to the sixth embodiment of the invention.

Figure 21:
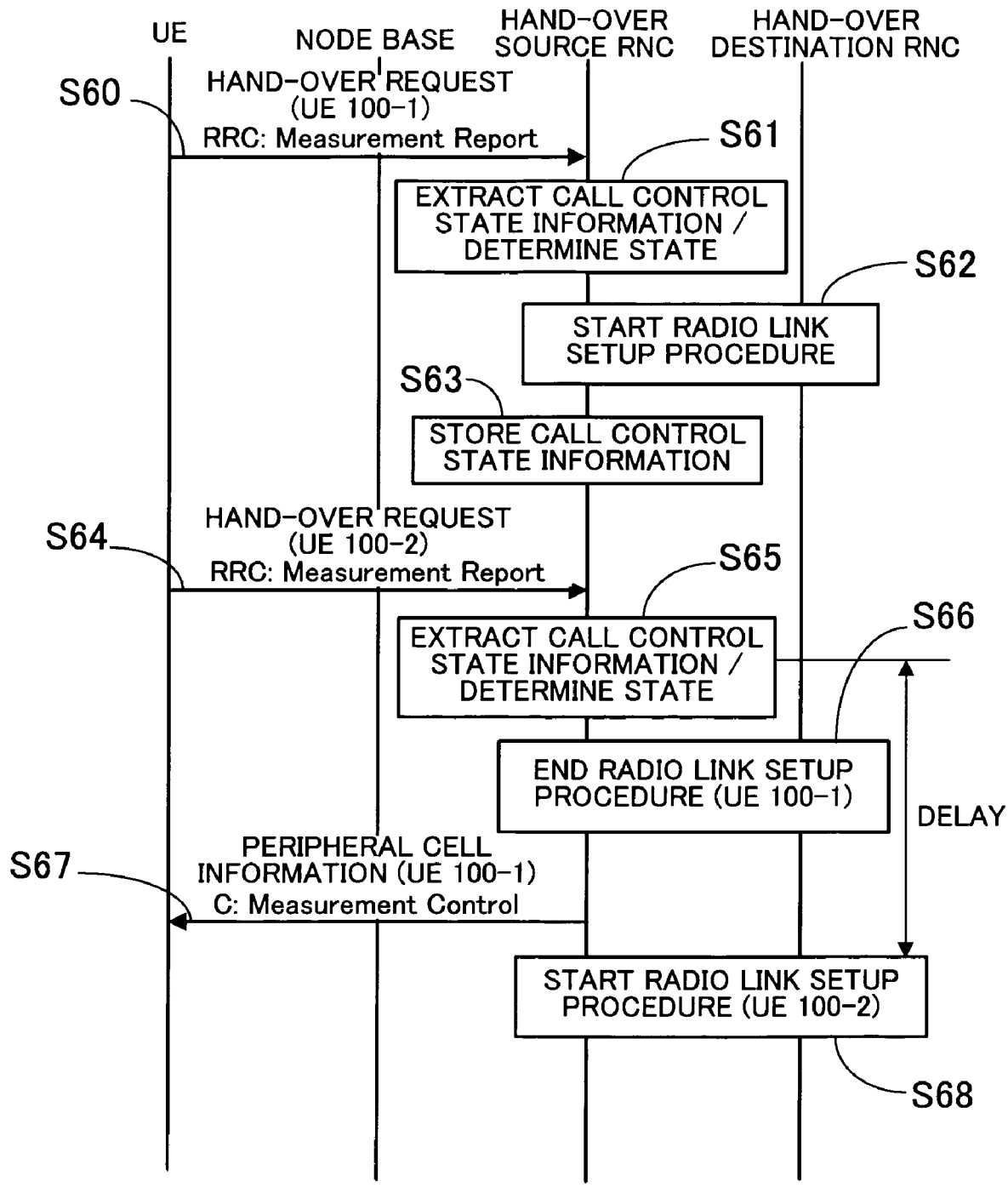
FIG. 21 is a sequence view showing the operation to be executed when the mobile radio communication system of the sixth embodiment originates a call.

FIG. 21 is a sequence view showing an operation to be executed when the communication system of the sixth embodiment originates a call.

Herein, the hand-over operation concerns with the movement between the cells controlled under the node bases managed by the different RNCs. In this case, the source RNC of the hand-over operation is the RNC 300$a$ shown in FIG. 20.

With movement of the UE 100-1, the UE 100-1 transmits a hand-over request to the source RNC 300$a$ through the measured result transfer signal (RRC: Measurement Report) of the RRC protocol (step S60), when the call connection processing unit 320$a$ of the RNC 300$a$ extracts the call control state information of the other UE 100-2 of the pair from the call control state information storage area 354 and determines the call control state based on the extracted information (step S61). If the UE 100-2 is not in the hand-over state, the operation is executed to start the radio link setup procedure for executing the hand-over between the source RNC 300a and the destination (step S62). The call control state information storage area 354 of the source RNC 300a stores the call control state information that indicates the UE 100-1 is being handed over (step S63). Further, when the UE 100-2 transmits the hand-over request to the source RND 300a (step S64), the call connection processing unit 320a of the RNC 300a extracts the call control state information of the other pair of the UE 100-2, that is, the UE 100-1 from the call control state information storage area 354 and then determines the call control state (step S65). If it is determined that the UE 100-1 is being handed over, the call connection processing unit 320a delays the hand-over operation of the UE 100-2 through the effect of the hand-over delay circuit 321. Upon completion of the radio link setup procedure of the UE 100-1 (step S66), the source RNC 300a of the hand-over operation transmits the peripheral cell information to the UE 100-1 through the signal for the RCC protocol changing procedure (RRC: Measurement Control) (step S67). Afterwards, the operation is executed to start the radio link setup procedure for the hand-over operation of the UE 100-2 awaited by the hand-over delay circuit 321 (step S68).

The foregoing process makes it possible to prevent simultaneous disconnection of the paired equipments resulting from "out of the radio synchronization" in the hand-over process.

In turn, the description will be oriented to the mobile radio communication system according to the seventh embodiment of the invention.

The mobile radio communication system of the seventh embodiment has the same arrangement as that shown in FIG. 1 or 15. Herein, the operation of the system of the seventh embodiment will be described with reference to FIG. 1 that illustrates the mobile radio communication system of the first embodiment, that is, that the UEs 100-1 and 100-2 store the paired-equipments information.

Figure 22:
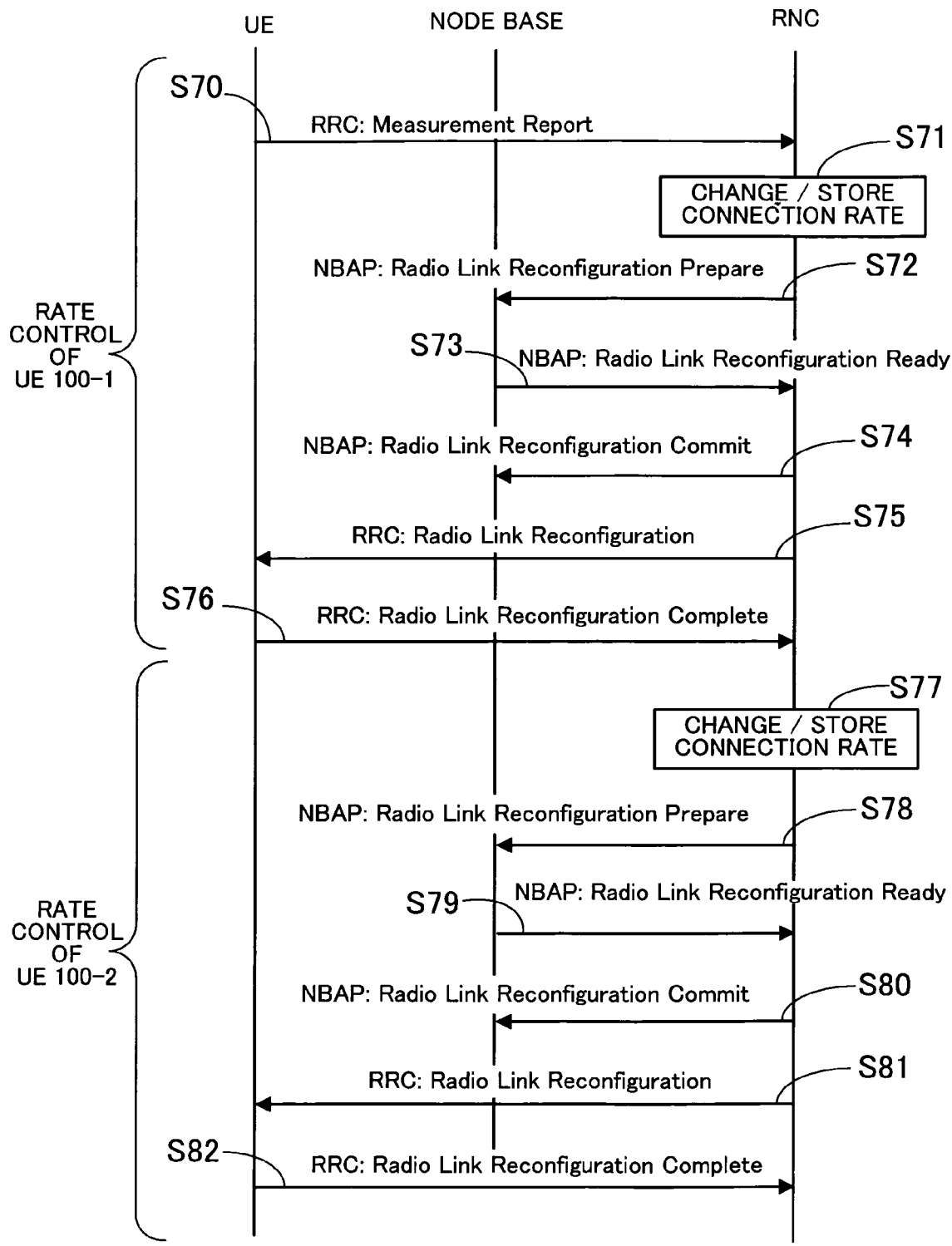
FIG. 22 is a sequence view showing the operation to be executed when a mobile radio communication system of a seventh embodiment originates a call.

FIG. 22 is a sequence view of the mobile radio communication system of the seventh embodiment.

When the UE 100-1 transmits to the RNC 300 the connection rate information of its own through the measurement report signal of the RRC protocol (step S70), in response, the RNC 300 stores the connection rate information of the UE 100-1 in the connection rate information storage area 353 of the equipment management information storage unit 350 by changing the received connection rate of the UE 100-1 (step S71). Afterwards, the process of the steps S72 to S76 is executed to reconfigure the radio link with the UE 100-1 again.

Turning to the other equipment UE 100-2 of the pair, if the equipment control unit 330 recognizes that the connection rate of the UE 100-2 is lower than that of the UE 100-1, the equipment control unit 330 changes the connection rate of the UE 100-2 into the same rate as the connection rate of the UE 100-1 and then stores in the connection rate information storage area 353 the changed connection rate as the connection rate information of the UE 100-2 (step S77). Afterwards, the process of the steps S78 to S82 is executed to reconfigure the radio link with the UE 100-2.

As described above, the securement of the connection rate of the other UE 100-2 of the pair based on the connection rate of the UE 100-1 allows the peripheral cell information controller 331 to execute the hand-over operation of the UE 100-2. Hence, the UE 100-2 may start the communication through the secured band. It means that the UE 100-2 may keep the stable communication. Further, the application of such a function proposed in the system of the seventh embodiment to the foregoing systems of the first to the sixth embodiments makes it possible to keep the quality of the communication higher in the system of each embodiment.

In the foregoing description, the combinational number of the mobile user equipments is two (pair). It may be three or more.

According to the present invention, the storage of the paired-equipments management information in the radio network controller allows a plurality of mobile user equipments (UEs) to be identified and managed as one group. The control unit of the radio network controller controls the mobile user equipments belonging to the same group to be connected with the respective ones of the cells formed by the node base. This allows a plurality of mobile user equipments belonging to the same group to execute the multiple communications, thereby keeping the communication quality more improved. Further, this also prevents simultaneous disconnection of the radio links of the mobile user equipments belonging to the same group, which allows any one of the mobile user equipments to keep the communication stable.

That is, even if a plurality of mobile user equipments are connected with one personal computer or the same function as those plurality of user equipments are accommodated in one mobile user equipment, the hand-over operation in the fast transmission of massive data never disconnect the radio link from the node base even at an instant time.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for managing a radio network in a mobile communication system, the apparatus comprising:
   a storage unit storing information indicating that a first mobile user equipment (UE) is associated with a second mobile UE; and
   a control unit that selects two different peripheral cells for the first and second mobile UEs which are connected to a same base station and are associated with each other and provides the first mobile UE with information about one of the selected peripheral cells, as well as the second mobile UE with information about the other of the selected peripheral cells when the control unit detects that the first mobile UE and the second mobile UE are associated in the storage unit.

2. An apparatus for managing a radio network in a mobile communication system, the apparatus comprising:
   a storage unit storing information indicating that a first mobile user equipment (UE) is associated with a second mobile UE; and
   a control unit that selects first and second frequency bands that are different from each other and assigns the first frequency band to the first mobile UE connected to a base station, as well as the second frequency band to the second mobile UE connected to the base station when the control unit detects that the first mobile UE and the second mobile UE are associated in the storage unit.

3. An apparatus for managing a radio network in a mobile communication system, the apparatus comprising:
   a storage unit storing information indicating that a first mobile user equipment (UE) is associated with a second mobile UE; and
   a control unit that uses a first algorithm in selecting a peripheral cell for the first mobile UE connected to a base station, and uses a second algorithm that is different from the first algorithm in selecting a peripheral cell for the second mobile UE connected to the base station when the control unit detects that the first mobile UE and the second mobile UE are associated in the storage unit.

4. An apparatus for managing a radio network in a mobile communication system, the apparatus comprising:
- a storage unit storing information indicating that a first mobile user equipment (UE) is associated with a second mobile UE; and
- a control unit that executes a handover of the second mobile UE connected to a base station when the first mobile UE connected to the base station is not in process of handover, and delays a handover operation of the second mobile UE when the first mobile UE is in process of handover, when the control unit detects that the first mobile UE and the second mobile UE are associated in the storage unit.

5. An apparatus for managing a radio network in a mobile communication system, the apparatus comprising:
- a storage unit storing information indicating that a first mobile user equipment (UE) is associated with a second mobile UE; and
- a control unit that applies a connection rate to the second mobile UE connected to a base station when the control unit detects that the first mobile UE connected to the base station and the second mobile UE are associated in the storage unit, the connection rate being the same as a connection rate having been applied to the first mobile UE.

6. The apparatus according to claim 5, wherein the control unit changes the connection rate of the second mobile UE in accordance with a change in the connection rate of the first mobile UE.

7. An apparatus for managing a radio network in a mobile communication system, the apparatus comprising:
- a storage unit storing information indicating that a first mobile user equipment (UE) is associated with a second mobile UE; and
- a control unit that selects two different peripheral cells for the first and second mobile UEs which are connected to a same radio base station and are associated with each other and provides the first mobile UE with information about one of the selected peripheral cells, as well as the second mobile UE with information about the other of the selected peripheral cells when the control unit detects that the first mobile UE and the second mobile UE are associated in the storage unit.

* * * * *